(12) United States Patent
Wang et al.

(10) Patent No.: US 6,834,326 B1
(45) Date of Patent: Dec. 21, 2004

(54) RAID METHOD AND DEVICE WITH NETWORK PROTOCOL BETWEEN CONTROLLER AND STORAGE DEVICES

(75) Inventors: Peter S. S. Wang, Cupertino, CA (US); David C. Lee, San Jose, CA (US)

(73) Assignee: 3Com Corporation, Marlborough, MA (US)

(*) Notice: Subject to any disclaimer, the term of this patent is extended or adjusted under 35 U.S.C. 154(b) by 0 days.

(21) Appl. No.: 09/527,904

(22) Filed: Mar. 17, 2000

Related U.S. Application Data

(60) Provisional application No. 60/180,574, filed on Feb. 4, 2000.

(51) Int. Cl.[7] .............................................. G06F 12/02
(52) U.S. Cl. ....................... 711/114; 711/162; 711/154; 711/161; 370/355; 370/356
(58) Field of Search ............................. 711/114, 4, 162, 711/161, 154; 709/200; 710/1; 370/351–356

(56) References Cited

U.S. PATENT DOCUMENTS

| | | | | |
|---|---|---|---|---|
| 5,805,920 A | * | 9/1998 | Sprenkle et al. ................ | 710/1 |
| 6,000,020 A | * | 12/1999 | Chin et al. .................... | 711/162 |
| 6,098,155 A | * | 8/2000 | Chong, Jr. ..................... | 711/138 |
| 6,138,176 A | * | 10/2000 | McDonald et al. ............. | 710/6 |
| 6,141,788 A | * | 10/2000 | Rosenberg et al. ............ | 714/774 |
| 6,148,414 A | * | 11/2000 | Brown et al. ................... | 714/11 |
| 6,272,522 B1 | * | 8/2001 | Lin et al. ..................... | 709/200 |
| 6,304,942 B1 | * | 10/2001 | DeKoning .................... | 711/114 |
| 6,378,039 B1 | * | 4/2002 | Obara et al. ................... | 709/105 |
| 6,529,996 B1 | * | 3/2003 | Nguyen et al. ................ | 711/114 |

OTHER PUBLICATIONS

D. Meyer, Introduction to IP Multicast (Jun., 1998) from www.nanog.org/mtg–9806/ppt/davemeyer/, pp. 1–49.
T. Maufer and C. Semeria, Introduction to IP Multicast Routing, IETF Internet Draft (Apr. or May 1996), pp. 1–54.
C. Semeria and T. Maufer, Introduction to IP Multicast Routing (undated) from www.cs.utexas.edu/users/dragon/cs378/resources/mult1.pdf.
Juan–Mariano de Goyeneche "*Multicast Over TCP/IP HOWTO*" Mar. 20, 1998 consisting of 34 pages http://www.linuxdoc.org/HOWTO/Multicast–HOWTO.html.
B. Quinn "*IP Multicast Applications: Challenges and Solutions*" Nov. 1998 IP Multicast Initiative pp. 1–16.
B. Quinn "*IP Multicast Applications: Challenges and Solutions*" Jun. 25, 1999 Stardust Forums pp. 1–25.

* cited by examiner

*Primary Examiner*—Mano Padmanabhan
*Assistant Examiner*—Jasmine Song
(74) *Attorney, Agent, or Firm*—Ernest J. Beffel, Jr.; Haynes Beffel & Wolfeld LLP

(57) ABSTRACT

The present invention relates to transparent access to a redundant array of inexpensive devices. In particular, it provides a method and device for connecting redundant disk drives to a controller, preferably an intelligent switch, via a network. The disks are controlled by commands transported across the network. Commands may be SCSI, IDE/ATA or other commands. The network may comprise ethernet, fiber channel or other physical layer protocol. Commands can be encapsulated in IP packets and transmitted using either a reliable or unreliable transport protocol. Multicasting of packets from the controller to the multiple disk drives is part of the present invention.

74 Claims, 10 Drawing Sheets

| COMMAND ACCESS METHOD |
|---|
| COMMAND SET |
| TRANSPORT |
| PHYSICAL |

RAID METHOD AND DEVICE WITH NETWORK PROTOCOL BETWEEN CONTROLLER AND STORAGE DEVICES

RELATED APPLICATION DATA

Applicant claims the benefit of Provisional Application No. 60/180,574 entitled Networked RAID Method and Device, filed 4 Feb. 2000.

BACKGROUND OF THE INVENTION

1. Field of the Invention

The present invention relates to use of multicasting to implement a redundant storage protocol such as a redundant array of inexpensive devices (RAID), mirroring or striping of storage devices, where the storage devices are separated from a controller by a network. It is preferred for the controller to be hosted on an intelligent switch and for the controller to use SCSI commands to control the storage devices, although it alternatively can use IDE/ATA commands. The network may comprise ethernet, fibre channel or another physical layer protocol. One or more commands, such SCSI commands, can be encapsulated directly in a network packet or encapsulated in IP packet. When commands are encapsulated in IP packets, either a reliable or unreliable transport protocol can be used. Preferably, the use a reliable multicast protocol can be avoided.

2. Description of Related Art

Network-attached storage (NAS) is a means to fulfill the needs of clients who want fast, scalable, high-bandwidth access to their data. It is a means to improve scalability of existing distributed file systems by removing the server as a bottleneck in using the network as bandwidth to allow parallelism by using striping and more efficient data pass. Significant to implementing network-attached storage is a trend towards increasingly intelligent storage devices. Intelligent storage devices provide functionality previously reserved to dedicated servers.

A second advantage of network-attached storage is reduced total cost of ownership (TCO). Network-attached storage offers convenient placement of storage devices. Plug-and-play configuration can be incorporated. Administration can be simplified, reducing the load on or need for information technology professionals who are needed to maintain and fine-tune dedicated servers.

A variation on the traditional client/server or Server Integrated Disk (SID) system uses SCSI commands across a network. This scheme is referred to as Server Attached Disk (SAD). This new model allows storage devices to be arbitrarily placed on a network. A SCSI protocol such as NetSCSI is used by the server to control the remotely located storage devices. Users of a NetSCSI system can have their own storage area network (SAN) using their existing networks and intelligent SCSI hard disks, without the added cost and complexity of high-end storage area network systems.

An additional concern that is always present in storage systems and may be accentuated by network-attached storage is redundancy. Recovery from failure of an individual storage device requires some degree of redundancy. File servers have used redundant arrays of inexpensive devices (RAID) to provide redundancy. Several RAID levels have been defined. RAID level 1, for instance, involves mirroring of paired storage extents on distinct physical devices. Failure of one device leaves the other device available. RAID level 4, as an alternative, involves using two or more extents of storage devices plus an additional extent for parity data. Again, failure of one device can be overcome by reconstructing the data on the failed device from the remaining devices.

Implementation of RAID has typically required trained information technology professionals. Network administrators without formal information technology training may find it difficult to choose among the alternative RAID configurations. Growth in storage needs may require choice of a different configuration and migration from an existing to a new RAID configuration. The selection of hardware to implement an array may involve substantial expense. A relatively simple, inexpensive and preferably self-configuring scheme for redundant storage is desired.

Therefore, it is desirable to provide redundant storage across a network to assure redundancy while providing automatic configuration to reduce the total cost of system ownership. It is further desirable to take advantage of network-oriented protocols, such as multicasting packets, to implement redundant storage in an efficient way.

SUMMARY OF INVENTION

The present invention includes using packet multicasting to implement redundant configurations of networked storage devices. It is preferred to use an intelligent switch, in communication with a plurality of storage devices, as a RAID controller. The intelligent switch may function as a thinserver, supporting a file system such as NFS or CIFS. By cascading switches, one or more of the storage devices in communication with the switch may actually be another switch, appearing as a virtual storage device.

The present invention includes multicasting command packets. In some protocols, such as SCSI, a series of commands may be required to establish communications between the initiator and the target, followed by data transfer. Multiple commands can be multicast in single packet. Read commands can advantageously be multicast to retrieve data from identically located blocks in different partitions or extents of data. Write commands can be multicast to establish communications. Data also may be multicast for certain configurations of RAID, such as mirrored disks and byte-wise striped disks.

Another aspect of the present invention is use of forward error correction to avoid the need for reliable multicast protocols. A variety of forward error correction algorithms may be used, including parity blocks. Forward error correction can be implemented on a selective basis. Error correction can be implemented when packet loss exceeds a threshold or on a transaction-by-transaction basis. Error correction can be supplemented by a dampening mechanism to minimize oscillation.

Another aspect of the present invention is control of multicast implosion. When multicast read commands are issued to numerous disks or for a large quantity of data, delay and backoff algorithms minimize oscillation.

The present invention is suitably implemented on a switch in communication with multiple storage devices over raw ethernet, IP over UDP, fibre channel, or other communications protocol.

DETAILED DESCRIPTION

Figure 1:
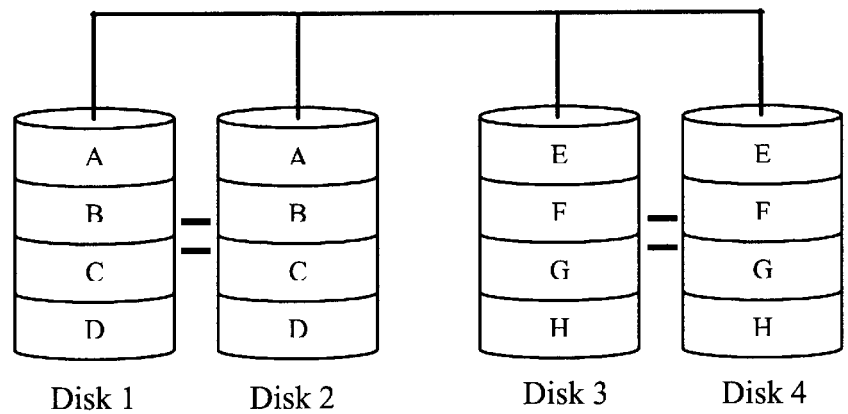
FIG. 1 illustrates RAID-1 using two pairs of disks.

A form of networked RAID (NetRAID) is required to provide the reliability and performance needed for small and medium sized enterprises. While RAID can be implemented using SCSI-over-IP technology, the present invention will leverage multicast capabilities to further improve performance. NetRAID may extend SCSI-over-IP (NetSCSI) autoconfiguration mechanisms to provide RAID autoconfiguration. NetSCSI protocol can be enhanced to support NetRAID.

Most storage devices are internal to a storage server and are accessed by the server's processor through effectively lossless, high-speed system buses. This simplifies the design of the storage hardware and software. The conventional wisdom is that LAN technology will not suffice in the storage world because it cannot provide the performance or reliability required. New gigabit Ethernet (GE) technologies may disprove the conventional wisdom. While the highest end of the market may remain loyal to server centric technologies, small and medium sized enterprises, especially price sensitive organizations, are expected to embrace new options.

In existing network systems, file stacks (filesystems and block drivers such as SCSI drivers) are not implemented to handle data loss. Data loss is generally viewed as a hardware error and the result is a time consuming hardware reset process. Also, timeouts are not effectively set and used which makes simple implementations of GE-based SANs more difficult. Minor changes in the implementation of file stacks are required to ensure that GE performance is comparable to Fibre Channel (FC.) With standardization of NetSCSI and NetRAID, appropriate modifications may be realized.

Background: RAID Primer

Redundant arrays of inexpensive disks (RAID) are used to improve the capacity, performance, and reliability of disk subsystems, allowing the potential to create high-performance terrabyte storage using massive arrays of cheap disks. RAID can be implemented in software or hardware, with the hardware being transparent to existing SCSI or FC drivers.

The premise of RAID is that n duplicate disks can store n times more data than one disk. This spanning property, by itself, simply provides capacity and no improvement in performance, as it implies that disks are access sequentially. The most obvious performance improvement is to interleave or stripe the data so that it can be accessed in parallel. Thus, n small and inexpensive disks theoretically can provide n times the storage of one disk at n times the performance of one disk using striping.

To improve reliability, two mechanisms are used. One is to simply copy, or mirror, the data. To mirror the four disks four additional disks are required, which is not an efficient use of capacity. Another approach is to add a parity disk to provide error detection and correction information. Parity is calculated as the exclusive-or (XOR) of the remaining data disks. If one data disks fails, the data can be recovered by reading the remaining data disks, including the parity disk, the bit or whole that failed can be reconstructed. A parity disk can be implemented on a stripe-wise basis, to minimize impact on read performance.

These features plus variations on how the parity is implemented have been standardized as RAID levels. There are six levels of RAID defined:

RAID linear—spanned
RAID 0—striped
RAID 1—mirroring
RAID 2—not used in practice
RAID 3—byte striped with parity disk
RAID 4—block striped with parity disk
RAID 5—RAID 4 with rotating parity
RAID 6 —similar to RAID 5 except for physical to logical mapping difference The different RAID levels have different performance, redundancy, storage capacity, reliability and cost characteristics. Most, but not all levels of RAID offer redundancy against disk failure. Of those that offer redundancy, RAID-1 and RAID-5 are the most popular. RAID-1 offers better performance, while RAID-5 provides for more efficient use of the available storage space. However, tuning for performance is an entirely different matter, as performance depends strongly on a large variety of factors, from the type of application, to the sizes of stripes, blocks, and files.

RAID-linear is a simple concatenation of partitions to create a larger virtual partition. It is used to create a single, large partition from a number small drives. Unfortunately, this concatenation offers no redundancy, and even decreases the overall reliability. That is, if any one disk fails, the combined partition will fail.

RAID-1 is involves mirroring. Mirroring is where two or more partitions (or drives), all of the same size, each store an exact copy of all data, disk-block by disk-block. The logical addresses of corresponding disk-blocks in extents on different physical drives are the same. Mirroring gives strong protection against disk failure. If one disk should fail, another exists with the an exact copy of the same data. Mirroring can also help improve performance in I/O-laden systems, as read requests can be divided up between several disks. Unfortunately, mirroring is also the least efficient in terms of storage: two mirrored partitions can store no more data than a single partition. FIG. 1 illustrates RAID-1. The letters refer to the and order of data. That is, the same letter indicates the same data. The data is ordered A, B, C, D, E and so on. The same data is duplicated on two disks: disk 1 is mirror of disk 2 and disk 3 is mirror of disk 4.

Striping is the underlying concept behind all RAID levels. Other than RAID-1 a stripe is a contiguous sequence of disk blocks. A stripe may be as short as a single disk block, or may consist of thousands of blocks. The RAID drivers split up their component disk partitions into stripes; the different RAID levels differ in how they organize the stripes, and what data they put in them. The interplay between the size of the stripes, the typical size of files in the file system, and their location on the disk is what determines the overall performance of the RAID subsystem.

Figure 2:
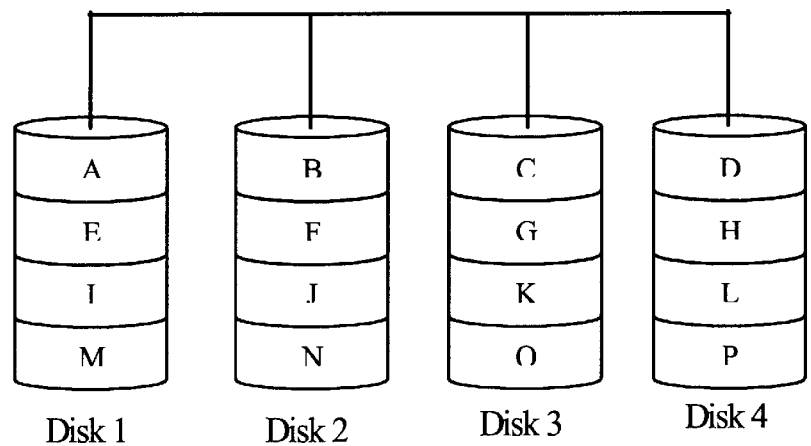
FIG. 2 illustrates RAID 0 spanning and interleaving of data across four disks.

RAID-0 is much like RAID-linear, except that the component partitions are divided into stripes and then interleaved. Like RAID-linear, the result is a single larger virtual partition. Also like RAID-linear, it offers no redundancy, and therefore decreases overall reliability: a single disk failure will knock out the whole thing. RAID-0 is often claimed to improve performance over the simpler RAID-linear. However, this may or may not be true, depending on the characteristics to the file system, the typical size of the file as compared to the size of the stripe, and the type of workload. The ext2fs file system already scatters files throughout a partition, in an effort to minimize fragmentation. Thus, at the simplest level, any given access may go to one of several disks, and thus, the interleaving of stripes across multiple disks offers no apparent additional advantage. However, there are performance differences, and they are data, workload, and stripe-size dependent. This is shown in FIG. 2. The meaning of letters is the same as that described in RAID-1. The data is copied to disk 1, then the next data is copied to disk 2 and so on.

Figure 3:
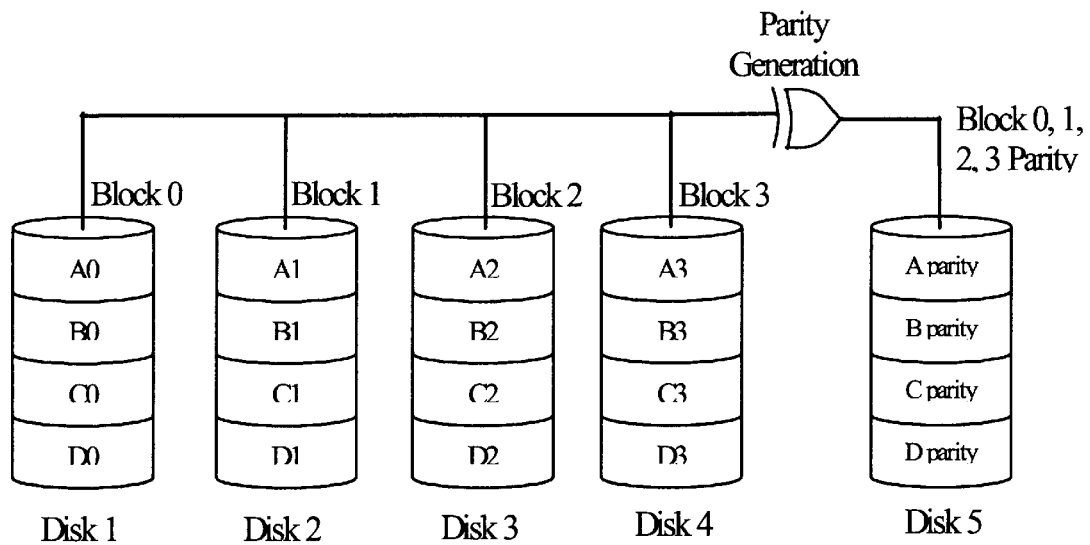
FIG. 3 illustrates RAID 4 using disk 5 for parity data.

RAID-4 interleaves stripes like RAID-0, but it requires an additional partition to store parity information. The parity is used to offer redundancy: if any one of the disks fail, the data on the remaining disks can be used to reconstruct the data that was on the failed disk. Given N data disks, and one parity disk, the parity stripe is computed by taking one stripe from each of the data disks, and XOR'ing them together. Thus, the storage capacity of a an (N+1)-disk RAID-4 array is N, which is a lot better than mirroring (N+1) drives, and is almost as good as a RAID-0 setup for large N. Note that for N=1, where there is one data drive, and one parity drive, RAID-4 is a lot like mirroring, in that each of the two disks is a copy of each other. However, RAID-4 does not offer the read-performance of mirroring, and offers considerably degraded write performance. This is because updating the parity requires a read of the old parity, before the new parity can be calculated and written out. In an environment with lots of writes, the parity disk can become a bottleneck, as each write must access the parity disk. FIG. 3 shows RAID-4 where N=4. RAID-4 requires a minimum of 3 partitions (or drives) to implement.

RAID-2 and RAID-3 are seldom used in practice, having been made somewhat obsolete by modern disk technology. RAID-2 is similar to RAID-4, but stores Error Correcting Code (ECC) information instead of parity. Since all modem disk drives incorporate ECC under the covers, this offers little additional protection. RAID-2 can offer greater data consistency if power is lost during a write; however, battery backup and a clean shutdown can offer the same benefits. RAID-3 is similar to RAID-4, except that it uses the smallest possible stripe size. As a result, any given read will involve all disks, making overlapping I/O requests difficult/impossible. In order to avoid delay due to rotational latency, RAID-3 requires that all disk drive spindles be synchronized. Most modem disk drives lack spindle-synchronization ability, or, if capable of it, lack the needed connectors, cables, and manufacturer documentation. Neither RAID-2 nor RAID-3 are supported by the Linux software RAID drivers.

Figure 4:
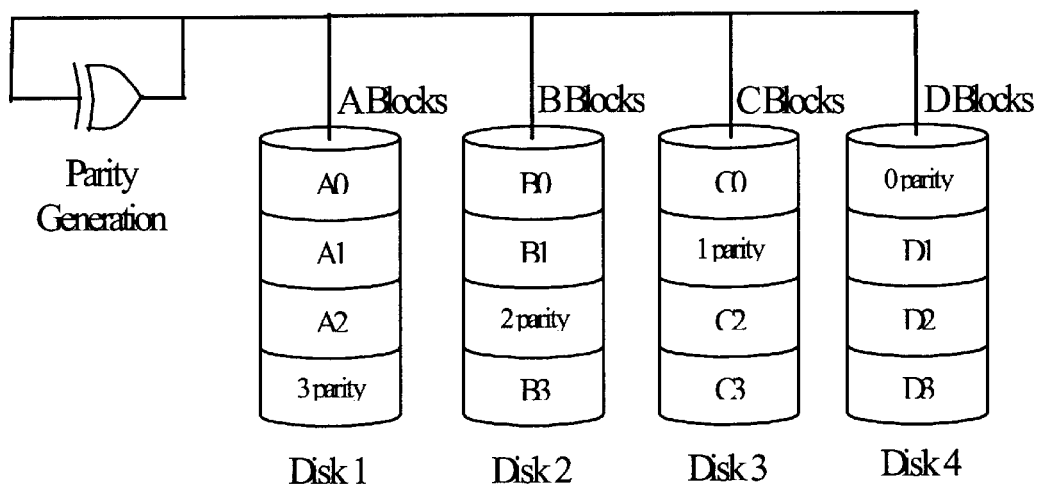
FIG. 4 illustrates RAID 5 placing parity data on alternating disks.

RAID-5 avoids the write-bottleneck of RAID-4 resulting from the need to update parity using a read of the old parity, before the new parity can be calculated and written out, by alternately storing the parity stripe on each of the drives. However, write performance is still not as good as for mirroring, as the parity stripe must still be read and XOR'ed before it is written. Read performance is also not as good as it is for mirroring, as, after all, there is only one copy of the data, not two or more. RAID-5's principle advantage over mirroring is that it offers redundancy and protection against single-drive failure, while offering far more storage capacity when used with three or more drives. This is illustrated in FIG. 4. RAID-5 requires a minimum of 3 partitions (or drives) to implement.

Other RAID levels have been defined by various researchers and vendors. Many of these represent the layering of one type of raid on top of another. Some require special hardware, and others are protected by patent. There is no commonly accepted naming scheme for these other levels. Sometime the advantages of these other systems are minor, or at least not apparent until the system is highly stressed. Besides RAID-linear, RAID-0, RAID-1, RAID-4 and RAID-5, Linux software RAID does not support any of the other variations.

Background: RAID over SCSI/FC

Using SCSI, an initiator (say a host CPU) will send a command to a particular target (disk) and then the target will control the remaining transactions. Because a target might take some time to perform the requested operation (e.g., rotate the disk so the right data is under the read head), it may release the SCSI bus and allow the initiator to send other commands. This allows multiple block read/write operations to occur in parallel.

To implement RAID stripes over SCSI, multiple commands are sent to multiple devices to read or write data. The RAID controller will assemble the striped data after it is read. The use of multiple commands is inherently inefficient and an implementation of RAID using LAN technologies can leverage multicast to remove this inefficiency. At the same time, other LAN features can be leveraged to improve the performance of RAID over a LAN.

Because fiber channel (FC) can broadcast to a particular partition and get multiple responses back, NetRAID can apply to FC. The standard way to do this appears to overlay SCSI on top of FC and not to use broadcast. FC does have the benefit that it can multiplex commands over the fabric for improved efficiency over SCSI (instead of serial multiplexing used in SCSI).

RAID Using Multicast Possibilities

The opportunity to improve RAID with multicast rests in four areas: read from a mirrored storage device; read from striped/spanned storage device; write to mirror/backup storage device; and write to a striped/spanned storage device.

Multicast reads from target storage devices (disks) are much easier than writes; with mirrored storage devices being easier to multicast than striped. Mirrored data is duplicate data, meaning that the host only cares if it gets back one copy and it can ignore the other copies and any lost copies. Striped data is not a duplicate data; it is data interleaved across multiple targets. If parity data exists (RAID 4/5), then the host can afford to lose one response from a disk and still be able to build the correct data. Further, the host knows what data is missing and can query disks directly.

Writing data means that the host has to verify that packets were successfully received and written, regardless of whether it was mirrored or striped. For a large number of devices and large amount of data, this becomes problematical. A "reliable multicast" protocol is clearly not desirable, due to the data implosion problem associated with a large number of simultaneous responses to a multicast request. The design issue in term of writing relates to the size of the data stream being sent, the number of devices being sent to, and the packet loss. Packet loss, in turn, relates to the number of hops in the network. The more hops or further out the data goes, the higher the loss probability. Also affective writing strategies is the type of striping/interleaving that is performed—bit level, byte/word level, or block level. Research results published by others on disk striping using SCSI-RAID suggest block level striping. Any implementation of the present invention should support all levels of RAID and allow room for future encoding techniques.

In striping with parity, updating data is more complicated than writing new data. For a stripe across four disks (3 data, 1 parity), two reads (for the data on the other disks) and two writes (for the new data and parity blocks) are done to update one block. One way to minimize the disk accesses is to withhold the write until the other two blocks are written to, requiring smart and non-volatile caching.

In theory, SCSI commands can send and receive up to 256 blocks of data with a block nominally being 1024 bytes. Sending 256 kb of data reliably is difficult. However, SCSI protocols do not require devices to support uninterrupted transfer of 256 blocks of data. Implementations of NT and Linux often to use 16K buffers as default. Other information suggests using 64 k-based stripes for optimal size for performance. The key point is that size of the data sent per command can be controlled so that it can be handled without complex reliability mechanisms. In other words, the overhead of retransmitting four SCSI commands is likely to be less than the overhead of transmitting one SCSI command using the reliable multicast. Clearly, it is possible to incorporate intelligence to automatically determine the optimal block size at the time the RAID volume is created.

For mirrored disks, all n packets may be multicast and each receiver will acknowledge, positively and negatively and in aggregate, what packets were received and what packets were lost. For striped disks, data will be unicast to each disk. Use of forward error correction (FEC) encoding/techniques will allow one or two packets to be lost and the data to be recovered, eliminating multicast reliability overhead. Assuming a packet loss rate of 5% (typical for the Internet, extremely high for a well-designed SAN), on average a packet would be lost every other command (n=16). Thus, a FEC that allows receiver recovery of one packet can reduce significant overhead. The protocol will allow the user to use various FEC algorithms or no FEC at all. One can easily image monitoring and statistical analysis techniques to active various levels of FEC when the error rate crosses a particular threshold.

For spanning, striped, and mirrored writes, a write commitment policy is used. This write commitment policy is used to ensure that all the disks have written the data. In the normal mode of operation, each disk will assume that the write is to be committed if a new write is sent from the same initiator. Otherwise, a timeout mechanism is used in the commitment process. If a write commitment is not received within a certain time range, an error condition may be assumed.

To further increase performance and reduce the loss rate, prioritization, buffering and careful partitioning of the disk array may be used. NetSCSI command and data packets should have the highest priority, related NetSCSI control protocol packets having the next highest priority, and management packets having the last level of priority. Other types of data should have a priority equal or lower than management packets.

The partitioning of disks into RAID extents should be done in a fashion that increases reliability without increasing the performance cost. The more disks that are mirrored or striped, the more processing that is required. The more that data access is parallelized by striping across more disks, the greater the throughput. Optimal performance depends on the type of striping used and application requirements such as bulk data transfer versus transaction processing. The more numerous the disks striped, the higher the risk of multicast implosion. This array of factors militates for autoconfiguration.

Packet loss may be addressed according to the present invention by the use of priority/buffering and FEC in the data stream. On well-designed SANs and SANs using 1000-Base-FX, the loss rate is likely not to be an issue. The mechanisms are in place to reduce the cost to design the SAN and to allow a wider geographic area to participate in a SAN. The protocol will be designed to ride on top of IP as well as Ethernet, the latter being a solution for those who desire performance, controllability, and security of a closed network. Full duplex, flow controlled Ethernet will minimize packet loss. While the speed of GE mitigates the need to make OS changes, the packet loss issue requires changes in the operating systems (OS) processing of SCSI timeouts.

Ultimately, some of the logic implementing the present invention should migrate into the NIC chipset and other functionality, such as wirespeed security and various performance tricks, should be incorporated. These performance features should be transparent to users and application software.

Network Systems Architecture

Switched RAID, according to the present invention, preferably is implemented with a disk storage that supports a form of SCSI-over-IP/Ethernet, referred to in this document as NetRAID. NetRAID is an extension of NetSCSI. For some purposes, NetRAID and NetSCSI are used interchangeably; however, the use of NetRAID specifically means that NetRAID extensions are being discussed. The disk may support other protocols, such as NFS and CIFS. The switch may be a server (e.g., support NFS and CIFS) or it may simply be a RAID controller on the network (e.g., a NetSCSI disk).

Figure 5:
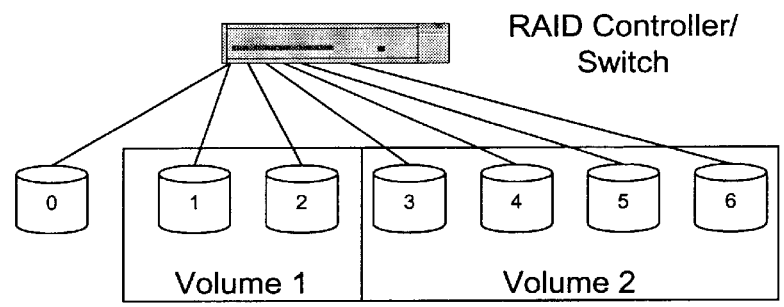
FIG. 5 illustrates a preferred architectural framework for a Switched RAID system.

The architectural framework for a Switched RAID system is shown in FIG. 5. A switching device will serve as the RAID controller for one or more RAID volumes, shown as volume 1 and volume 2. Volume 1 consists of disks 1 and 2 whereas volume 2 consists of disks 3 through 6. Volume 1 could be RAID 0+1 and volume 2 could be RAID 4. The controller can access the disk independently (without using RAID, a shown with the disk labeled 0. This disk can be a Networked Attached Storage (NAS) disk, which is a thin-server with standard file protocol support. This would be a hybrid Switched NAS/Switched RAID system. Standard RAID techniques are used with multicast enhancements to improve performance.

Multi-level RAID Aggregation

Figure 6:
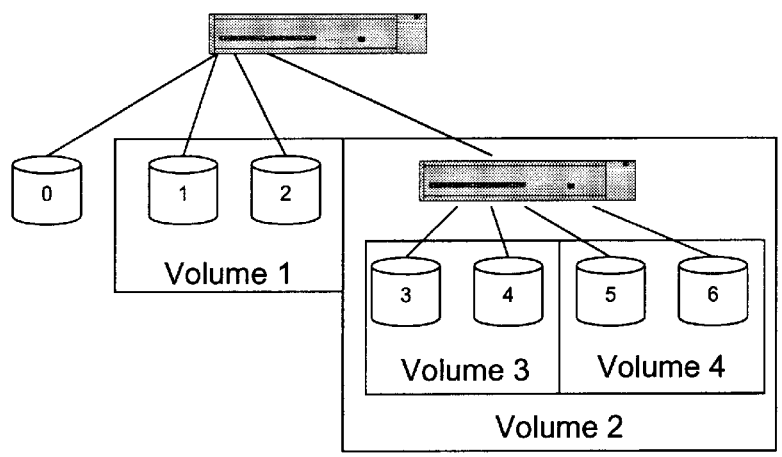
FIG. 6 illustrates cascading of virtual disks in a Switched RAID system.

The RAID controller may or may not have a filesystem (be a server or Thinserver). The switch/RAID controller could be another NetSCSI device on the network and even appear to be a disk to another RAID controller, as shown in FIG. 6. To a client accessing the topmost disk, there appears to be three disks, disk 0, volume 1, and volume 2. Volume 2 is actually composed of another RAID controller and two more disk volumes.

Autoconfiguration

To improve the manageability of the system, the disks may be autoconfigured. Note that the autoconfiguration is independent of the actual data transfer using NetRAID/

NetSCSI. Disks can be assigned a SCSI LUN and ID via the NetSCSI autoconfiguration protocol, which is the first step in the process. NetSCSI can operate over IP or raw Ethernet as desired by the user or defaulting to IP/UDP. Whatever transport protocol is used, the addresses of the disks are sent to the RAID controller and vice-versa. The NetRAID control protocol will integrate these functions and will provide RAID parameters to the disk including RAID-level, stripe size, and multicast group. The disks will supply characterization information (capacity, performance metrics, etc.) back to the RAID controller for use in the autoconfiguration process.

The RAID controller will automatically determine the underlying network, the number of disks, capacity of the disks, block sizes of the disk, cache information, and other disk characterization information. Network information includes if the disk is directly attached and if not, the number of hops/delay from the controller. Disk characterization information is important for load balancing and other scheduling activities and will be used for more than configuration. User supplied information also will be used for autoconfiguration.

User-supplied information includes the type of application(s) that will be run (generally, bulk data transfer, transaction processing, or hybrid), the estimate on required disk capacity for each application, the level of performance and redundancy (reliability and availability), preferred transport protocol, and so forth. Users may also specify to use only locally attached disks, which may be detected by the switch using Ethernet-based GARP multicast. This mechanism ensures that disk multicasts go directly to the switch.

All this information will be combined to select the number of RAID volumes (logical extents, how to partition the disks), logical block size, extent size per disk, stripe size, RAID level, etc. Thus, the outcome could be multiple RAID volumes of different sizes utilizing different RAID levels, etc. A number of possible selection criteria can be found, however, the criteria used in production systems will have to take into account possibly significant varying performance provided by NetSCSI disks. The algorithm must also take into account multicast implosion issues and buffering available in the RAID controller.

Note that the disks may be repartitioned at a later date and the autoconfiguration algorithms run again. Historical access information can then be feed into the algorithm.

Caching

The performance of the system and a competitive differentatiator is the cache subsystem. RAID without caching is expected to have poor performance. A number of possible read and write aggregation approaches can be used as well as combinations of caches (in the client NIC, in the switch, and in the disk NIC).

The use and design of NetSCSI as a stateless protocol improves the opportunities for intelligent switches in the datapath to help improve the performance. One can imagine Smart caches could store NetSCSI commands and data to improve multicast performance or client access performance. The NetRAID system architecture should allow for caching by different entities and replacement of the caching algorithms without redesign of the complete system.

Failover

There are two types of failovers that are of concern, that of the disks and that of the switch. Assuming, that a hot-ready disk and/or switch is available as needed, disk failover can be handled in the standard RAID fashion, assuming that redundancy was enabled for a particular volume (e.g., RAID 1 or higher). The disks must be constantly monitored by the RAID controller for problems. Additionally, the NetRAID control protocol will allow the disk to inform the RAID controller of self-diagnosed problems. Both activities may be done with NetRAID. Additionally, either the disk or controller can predict failure of a disk and take appropriate steps. When a problem is detected, the data is moved to a backup disk and/or an administrator is flagged. Utilizing the disk for additional load balancing and/or redundancy is possible (e.g., as a mirrored device or having unused extents on different disks).

The switch failover can be handled in the same way for Switched NAS and Switched RAID. A failed switches operation can be taken over by another switch. Mechanisms such as VRRP can be used to simplify the insertion of the switch so that the disks are unaware of the change. The management (or another) protocol handling the failures replicates all the switch data (which may include filesystem metadata) to the other switch. The other switch may be used for improved performance on reading data assuming cache coherency algorithms are used; however, improving performance on writes is a much harder multiprocessing task. These activities may be accomplished using the mechanisms provided by SCSI-4.

The redundancy feature is really an extension of the management software. Separate failure criteria apply to the switch and the disk. All this must be combined with device characteristics, traffic information, etc. to identify both performance bottlenecks (disk scheduling, disk, network, filesystem, etc.) and possible fixes, failures, possible failures, and operational and configuration issues.

Security

Using networked disks raises numerous security questions that did not exist in the server integrated disk model physically in the server. While the same questions are raised in a client/server paradigm, the perception is likely to be different. The new SCSI-4 command set addresses some of the security issues.

IP security can provide authentication and confidentiality features. Existing hardware solutions are available. However, reliance or IP security precludes the use of raw Ethernet. Raw Ethernet remains a good choice for high-performance, physically secure SANs.

For raw Ethernet, VLANs can also be used to provide some level of improved security by limiting access to the storage network. Network login could be used to provide more security. Both features can be applied to IP-based solutions as well.

SCSI-4 allows potentially different aggregation solutions to present themselves, instead of the block-level aggregation provided by RAID. This solution is inheritantly non-shared—in other words, only one client may use traditional RAID. The use of objects that have their own access control mechanisms allows multiple clients to access an object, which potentially creates a sharable RAID-type environment using NetRAID. This environment would have more of the processing moved from the client(s) to the disk.

Increased intelligence also creates other opportunities to improve performance. For example, standard disk to disk copy requires action by the host and its controller—each block must be read by the controller and then written. However, with more intelligent disks and higher-level primitives, a copy can be made directly by the disk to another disk, bypassing the host and controller.

Host System Architecture

A NetRAID system should support different types of filesystems while obtaining the best possible performance when using specialized hardware. The hardware should be leveragable over the different filesystems, caching systems, schedulers, etc. For example, database vendors typically implement their own internal data structures and access the raw file media directly.

Internal modules may also support different dialects of command sets. For example, the SCSI command set can change from SCSI-2/3 to the radically different SCSI-4. Thus, it is important to carefully define interfaces that allow this to occur.

Figure 7:
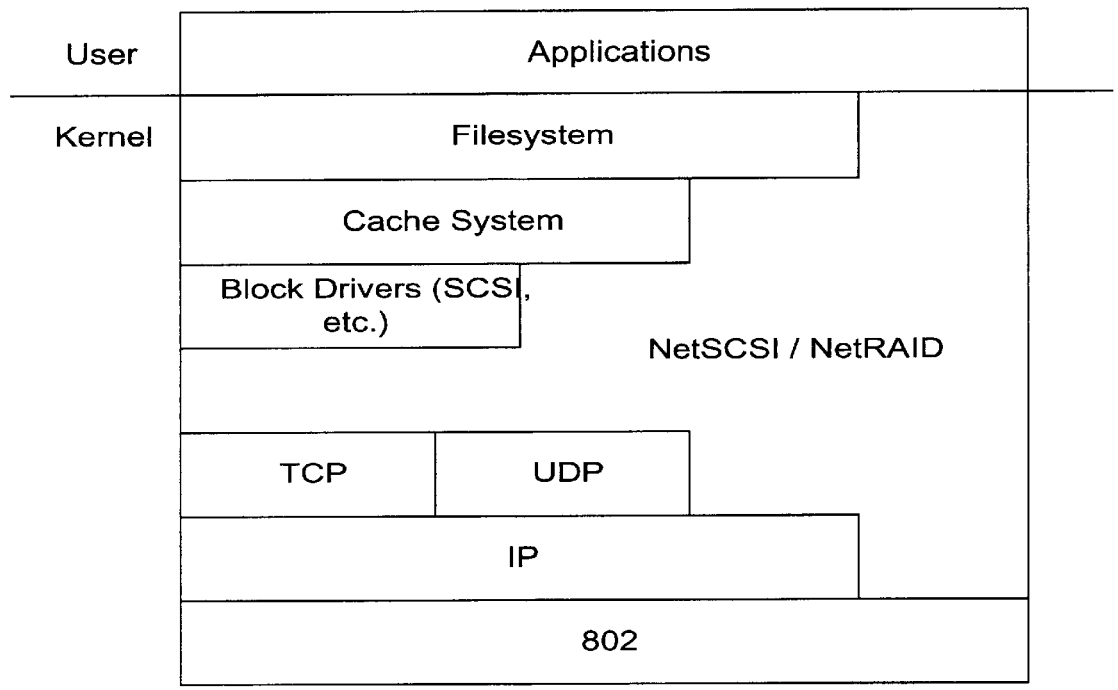
FIG. 7 illustrates a preferred software architecture for a RAID controller, such as one running on the switch.

The architecture for the RAID controller (host or switch) is shown in FIG. 7. Just like RAID is a subsystem of a SCSI stack, NetRAID 720 can be viewed as a lower layer to NetSCSI or integrated with NetSCSI, depending on implementation. Thus, NetSCSI should transport commands that may be accessible directly by applications, the filesystem, or traditional block drivers 704 (SCSI, IDE (using an IDE to SCSI conversion), etc.). Applications can directly access NetSCSI using the block-level commands if required or through the virtual filesystem interface semantics. Cache systems 703 may be incorporated directly into the filesystem or as a block-level cache system and the interface should support both. Filesystems 702 can directly access NetSCSI command sets and bypass block drivers if required. Inherent in this scheme is the scheduling mechanisms used at by subsystem. Note that all the bypass mechanisms are for performance and come at the penalty of a more complex system.

As noted earlier, NetSCSI is designed to operate over different network transports. In generally, it is designed to work over unreliable mechanisms such as UDP 732, 733 and Ethernet 734. The control algorithms for both mediums are the same; however, the overhead and complexity of each transport is different. The use of TCP 731 simply means that the reliability mechanisms of NetSCSI can be ignored (or implemented at an extra overhead cost). TCP may be preferred for internet traffic whereas UDP would be for a SAN or a site storage network. A high-performance SAN is likely to use raw Ethernet 734.

The goal of the NetRAID protocol design is to make it easy to implement in hardware and support the above, both which are somewhat contradictory. To separate the fastpath from the slowpath operations, NetRAID is assisted by a control protocol (CP). NetRAID is used to provide the bulk data transfers where as dynamic configuration information (block transfer size, FEC type, priority levels, etc.) is provided by the CP.

NetRAID Requirements and Approach

The NetSCSI autoconfiguration protocol is used to assign LUN and ID information to each disk. The NetRAID control protocol and the algorithm which run on the switch will configure each disk in a particular fashion. The disks are unaware of this configuration process and are merely treated as data devices. Smarter disks do not need to be involved in this configuration process as that information would have been provided to the RAID controller. After configuration, the disks know the RAID type, what multicast group they are in, what extent configurations are on the disk, and the stripe size used for the RAID volume.
Multicast Operation The design of NetRAID allows multicast to be used when beneficial and standard NetSCSI to be used when not beneficial. A group of disks becomes one RAID volume accessed via a multicast group, which is used to optimized some types of reads and writes. Each disk is assigned a LUN/ID during autoconfiguration. The RAID level, block mapping strategy, etc. is determined by the RAID controller. While it would be possible to multicast the data to the disks and have the disks select which data they need (reducing the burden on the RAID controller), the complexity to extend this scheme (e.g., if a customer wanted a slightly different striping technique) while accounting for all possible forms of RAID is high and would increase hardware costs for the disks.

Figure 8A:
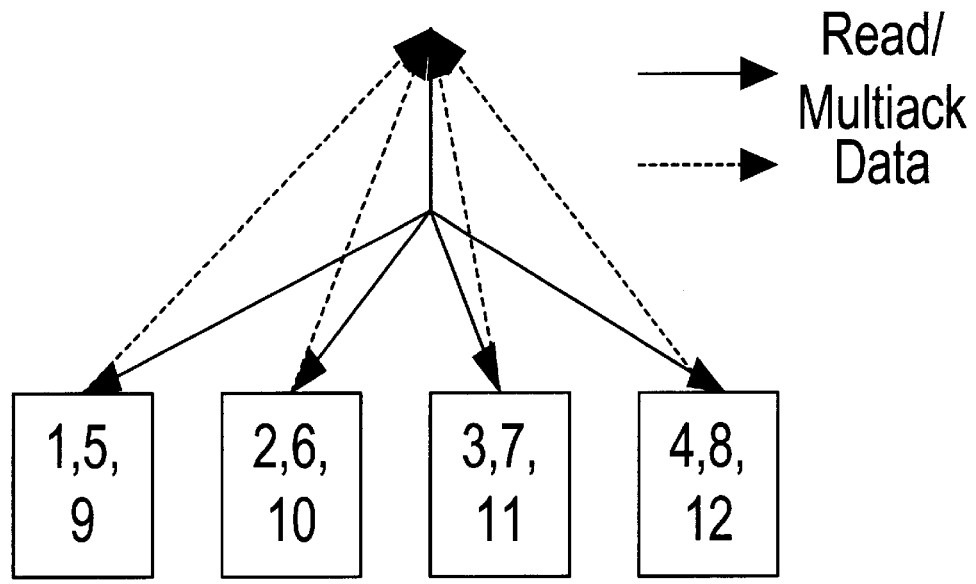
FIGS. 8a–8e illustrate multicasting from a source to storage devices and unicast responses.

In the examples shown in the figures, the SCSI status sequence is removed. The direction of the status packet is the same as the data packets. For some stripe depths, the implementation of RAID will vary from the figures. The typical operation will multicast implosion is defined as the number of responses to a multicast packet exceeding As shown in FIG. 8a, the multicast byte-interleaved read has data setting on each disk. Bytes 1, 5, 9 are on disk 1 (left-most), 2, 6, 10 are on disk 2, and so forth. All the bytes are at the same block location or address on each disk. The read request (say for bytes 1–4) goes to all disks and the disks respond. The write operation would be similar except that the host would do the data transfers to the disks. It is preferred that all the data is stored in the same logic block and the request is made for that block. The same mechanism can be used for block interleaving, which is more efficient.

Figure 8B:
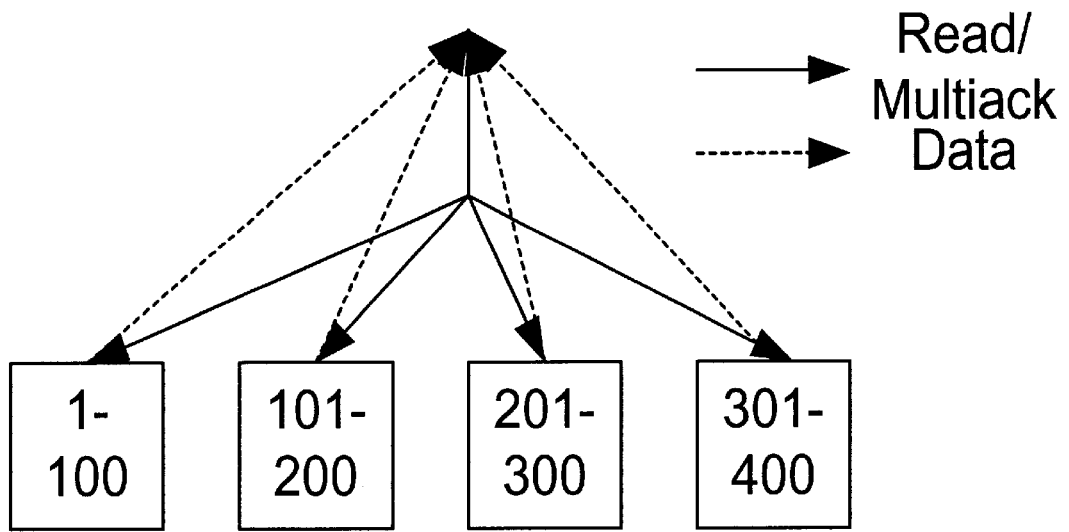
Figure 8C:
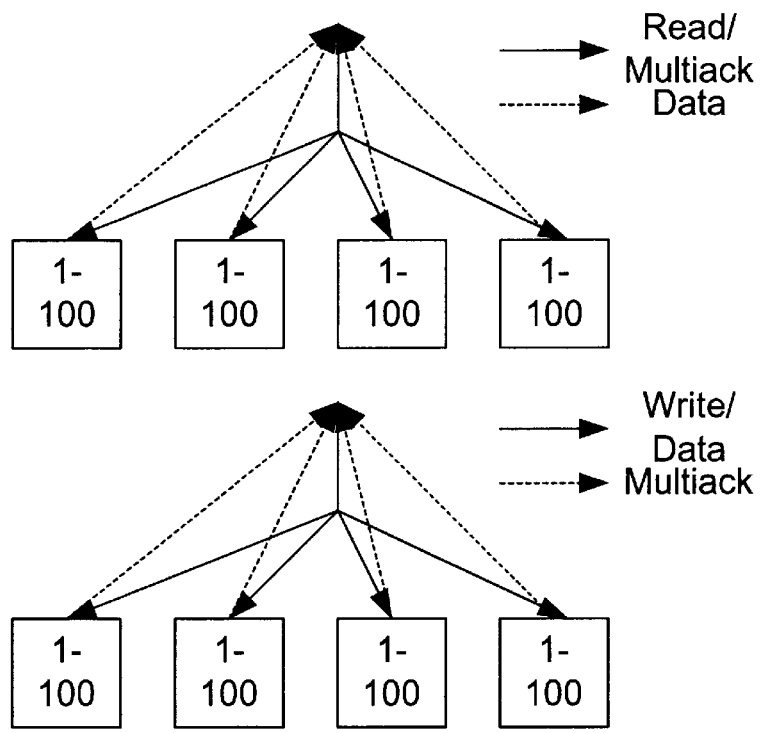

For a spanned RAID 0 read, the operation is similar, as shown in FIG. 8b. This time, a request would be made for bytes 1–400 via a read for some block n. Note that the reassembly of bytes relative to block location process is all done by the RAID controller.

In mirrored reads using RAID 1, the RAID controller is looking for the first disk to respond. The rest of the responses can be discarded; however, all responses should be examined for drive failure detection. Thus, the read command is multicasted without any special error protection.

In mirrored writes, all the disks must write the same data. Note that it may be beneficial to chain together multiple read commands into one packet (even without multicast). The RAID controller will multicast the command and the data to be written. Special error correction may be applied if activated. In both read and write, all packets contain the same transaction ID, which is unique to that RAID volume.

The read/write examples for RAID 1 multicast is shown in FIG. 8a for a stripe depth of one block. The multicast reads come from the host to the disks as well as the multiacks (if more than one packet of data is expected to be received). Note that is this case, multiacks are only sent after a timeout as it is likely the loss of the same packet from a disk will not be repeated. Redundant transmissions reduce the likelihood of packet loss. Multicast implosion (the unicast responses from each disk) which can increase the packet loss rate is a concern for the RAID 1 multicast read. 802.3x flow control may mitigate the problem. Backoff and other techniques which introduce a variable delay in response to a command also mitigate multicast implosion.

The multicast write does not incur a significant risk of implosion but the reliability mechanisms are more difficult. The multiack mechanism is used to enhance reliability. The entire set of blocks are written at once and the multiacks are evaluated to determine which blocks to retransmit. The retransmits can be multicasted or unicasted, depending on the number of disks that lost the packet. Multicasting the retransmission if only one disk lost it would mean that all other disks would have to spend processing cycles to handle the packet. The operational rule is that duplicate packets are discarded, as determined by looking at the NetSCSI transaction ID and sequence number field.

Reads for RAID 3 and higher are treated in the same manner as RAID 0, except that all the reads seek required data. If number of disks that do not respond are greater than n then another multicast is sent. If less than n, unicast commands are sent to each disk. If no response is obtained after some m attempts, then the drive is declared dead and the appropriate action can be taken. Note that the parity information can be used to reconstruct data if one disk fails.

The typical RAID 3+ write will be accomplished by unicasting data, as each disk stores a different set of data. The write command will be sent with the first data packet. This will be especially true if the data is small (one packet to each disk), then the command is not multicast out but unicast with the data.

One optimization for low-loss fabrics is to multicast out the write command and the unicast data (unless byte interleaving is used, in which case the data is multicast. For performance, disks should buffer data so that if they lose a write command, they can request that the command be resent without restarting data transmission.

For updating data, care must be taken to update the parity disk. This involves two reads and two writes. The reads and writes can be performed using the previously described multicast mechanisms, depending on the data size.

Figure 8D:
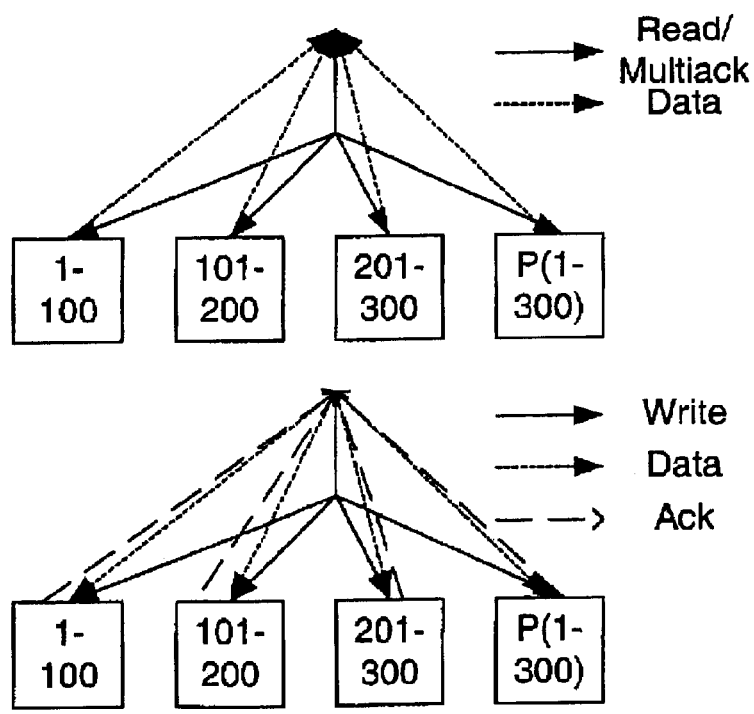

FIG. 8d shows RAID 4 reads and writes. The block size is 100 bytes with one block per disk. The stripe size is 300 bytes, the sum of the non-parity disks. The fourth disk is used to store parity information (in RAID 5 this could be distributed). The mechanics for the read is the same as before—the controller sends out the read command and receives data from the disks. A new write uses multicast to send the write command and may use unicast for each block of data or multicast for some block sizes. Block 1 (bytes 1–100) would be unicast to disk 1, block 2 (bytes 101–200) to disk 2, and so forth. The parity calculation would be done in the RAID controller and sent out like any other data.

Figure 8E:
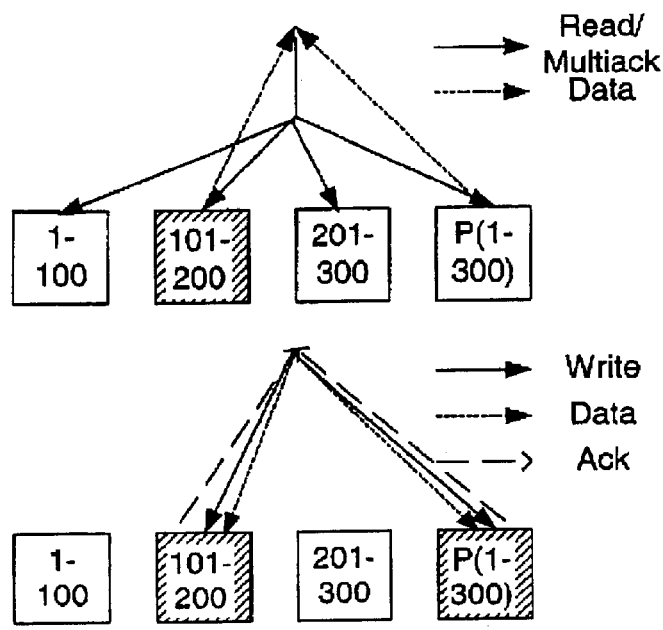

FIG. 8e shows the procedure for updates, for instance updating block 2 (became byte 102 was changed. The old block 2 and parity must be reread to provide sufficient information to regenerate the correct parity. Once that is known, the data may be written. The same multicast procedures for the normal RAID 4 read and new write can be used. The alternative solution is to use caching to aggregate the reads and writes.

In FIG. 8e, the multicast read to the whole group of disks 1 through 4 produces responses for disks 2 and 4. The information from disks 1 and 3 is needed if the parity information from disk 4 is lost. Parity information cannot be recovered from a subset of the data disks. Data from disk 2 is required in this example because a subset of bytes in the block is being changed, and the rest of the bytes in the block are unknown. If, however, the entire block contents are known, then only one unicast read to the parity disk (disk 4) is required. Two writes are still required. The bottom of FIG. 8e shows the write being unicast.

In all cases, packet loss and other statistics are kept for both activation of forward error correction (FEC) mechanisms and determining if there is a flaw in the disk, fabric, network design, configuration, etc. Such information may be used for automatic repartitioning of the volume as well. The FEC activation algorithm should minimize the likelihood of oscillation.

In all cases, multicast implosion (both the network and the host) should be monitored. Large bulk reads to large number of disks will generate many simultaneous responses which may overload the network. A slight delay and backoff algorithm should be incorporated by the NetSCSI entity. The backoff algorithm should ensure no oscillation occurs. 802.3x can be leveraged to help eliminate the problem.

A potential hardware optimization for all cases it to implement hardware filtering of repeated packets. For example, in the RAID 0 case where there are redundant responses, hardware can filter the excess packets.

Multicast operation over IP uses the standard IP multicast. The use of VLANs can serve as a simple form of multicast for direct operation over LANs instead of IP. The VLAN support would be used to provide a level of security for the RAID volume. A single or set of partitions will be assigned to a VLAN and the CP should support dynamic assignment and changing of current assignments. The mix that provides the optimal partitioning set for various RAID levels needs to be investigated but the protocol should be flexible enough to allow for all likely configurations. Alternatively, Ethernet-based multicast could be used.

FEC Algorithms and Activation Techniques

A number of possible FEC algorithms can be used to protect any number of bits but the easiest is a parity algorithm. This is because the XOR capability for RAID will already be available and can be leveraged to protect the multicast transmission (and unicast transmission if packet loss is high enough). NetSCSI will define a mechanism to divide the block into logical subunits (based on packet loss, number of stripes, and block size) that the parity mechanism can be applied to. For example, using 1 k MTUs and 64 k blocks and a 5 percent packet loss, every 10 packets will be protected by a parity packet. Thus, FEC of 1 bit is always this algorithm. Other levels are to be defined.

Normally, the FEC capability will be deactivated. If the packet loss threshold exceeds a certain level (such as 2–3 percent) and the block/stripe sizes are large enough, then the FEC capability can be activated. A damping mechanism should be used to ensure that changing packet loss rates do not cause oscillation problems. Further, the FEC should be combined with a slowdown in transfer rates to reduce the packet loss itself. Lastly, when FEC is used for a transaction, it should be used until the transaction is complete. FEC does not have to be used for every transaction (a bit flag in the NetSCSI header indicates if FEC is used for that transaction).

Prioritization and Fairness

Prioritization is used to control how buffers are allocated in the switch and on the disk and the priority levels of NetSCSI data and commands relative to each other. Prioritization should be adaptive, as part of the RAID controller algorithm. Priority levels should be user-configurable, with standard defaults provided. NetSCSI traffic may have a higher priority than the control panel (CP) traffic to provide maximum throughput; however, the CP packets are less in frequency and help control the throughput. To enhance throughput, NetSCSI should have a higher default priority than general traffic (e.g., SAN management traffic).

A separate fairness mechanism, if required and not already supported by the switch, can be build into the CP and system scheduling algorithms. Fairness is a hard-to-define property that all devices have equal chance to access the network. Fairness can be a problem if one disk is faster than other disks in sending packets as it slows other disks and RAID controllers down.

NetRAID Control Protocol

The NetRAID control protocol is a management protocol for the disk which should be integrated into the NetSCSI autoconfiguration protocol. NetRAID control protocol commands can be issued from one disk to another disk. At the most basic level, it provides real-time status updates to detect failure conditions of the switch and disk.

Control protocol is used to select the FEC levels, priority levels for different types of traffic, the RAID level for a group (to allow a disk to initiate commands to other disks in the case of SCSI-4 disks), the location of file managers (for SCSI-4), access to relative disk characterization statistics, and other management data. This information is placed in the NetSCSI packets as a separate packet type.

Hardware and Other Enhancements

For priority data, XOR parity calculations can be moved into hardware. Segmentation and reassembly of data also can be moved into hardware. Thus, the generation of the parity packets can be automatic for writes. The hardware support in switch can include a hardware RAID controller. Likewise, the datapath can be implemented in hardware on the client side.

The NetRAID CP should have a provision to determine the vendor and version of hardware, which allows the application of non-standard performance enhancements. Potential enhancements include non-standard MTUs and full-duplex, flow controlled Ethernet.

Small Computer System Interface (SCSI)

Figures 9, 10:
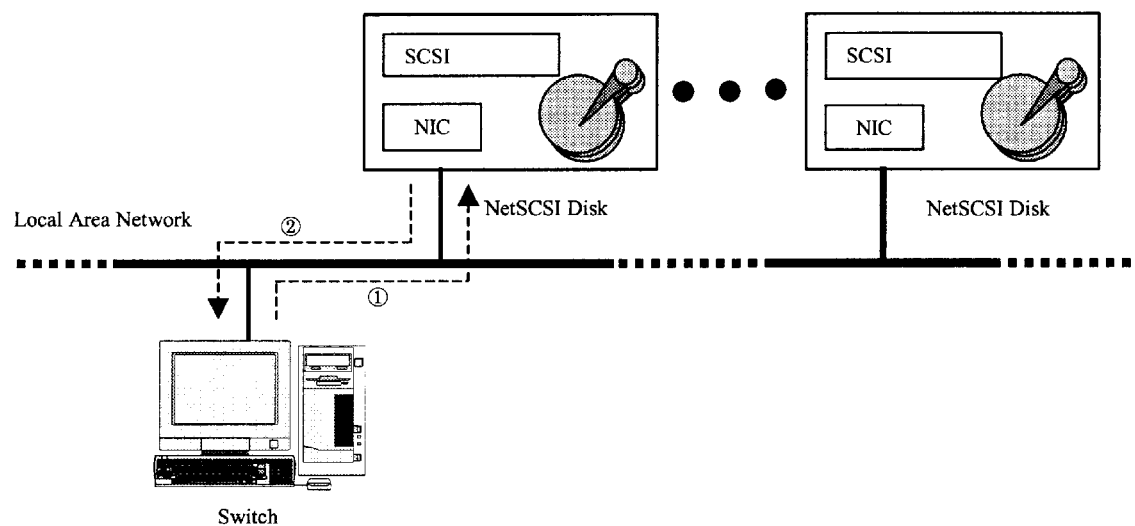
FIG. 9 illustrates the SCSI architecture layering.
FIG. 10 depicts an embodiment of NetSCSI utilizing a PC as a switch.
Figure 11:
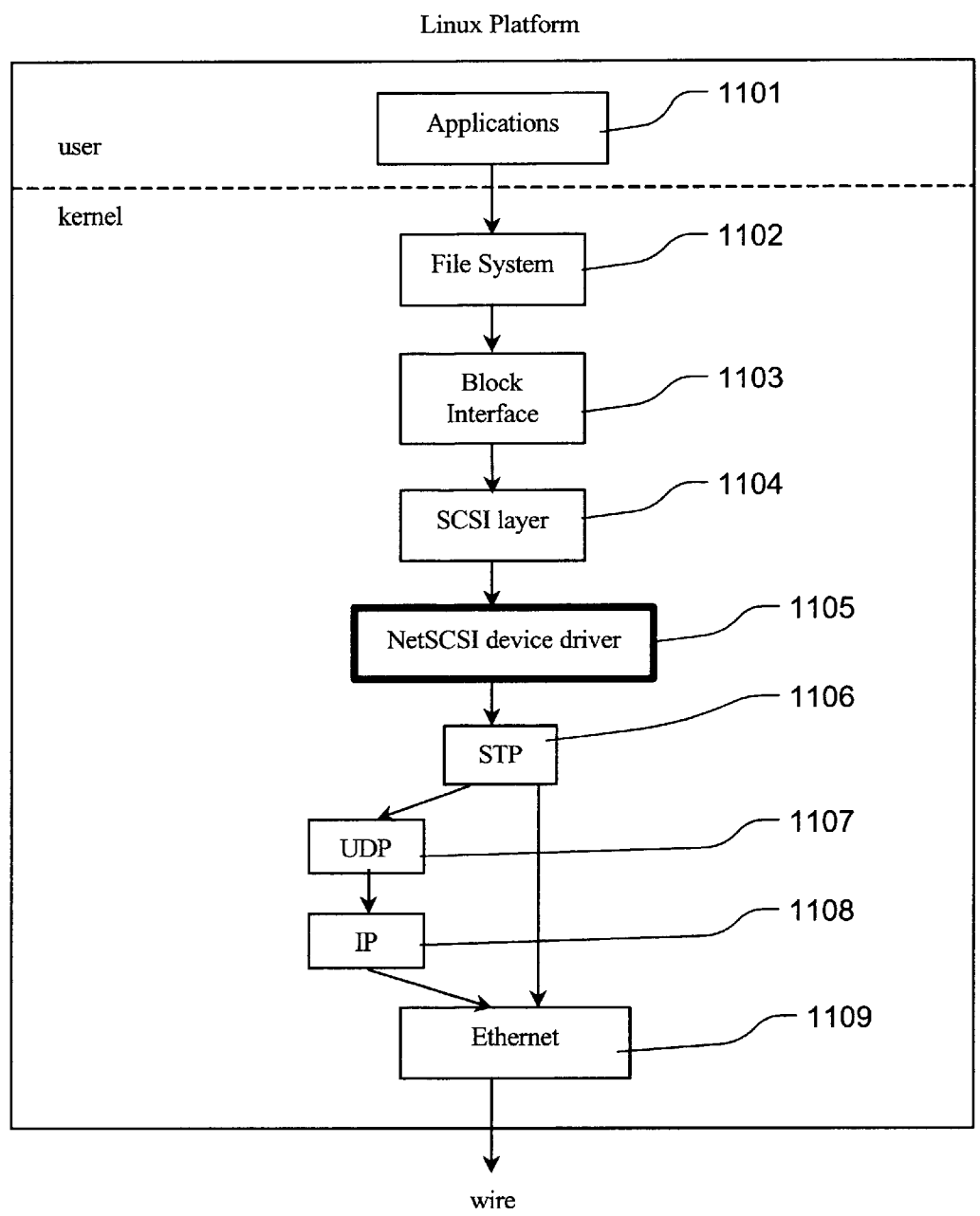
FIG. 11 depicts the layered design of a Linux platform.

SCSI is an acronym for Small Computer System Interface. It recognizes hard disk and tape drives, various types of optical disk drives, printers, scanners, processors, communications devices, and medium changers. The SCSI standard has also changed to take advantage of newer hardware and more intelligent controllers. Caching is recognized. Intelligent command queuing is supported. There are provisions for intelligent self-testing by a peripheral. The data path has widened from 8 bits to 32 bits. SCSI is both a bus specification, and a command set for use of that bus. The SCSI architecture is illustrated in FIG. 9. The core of the SCSI idea is to give complete device independence to the computer. In other words, all hard disks look alike, except for their total capacity. All printers look alike. All CD-ROMs look alike, and so on. Within any one device type, the system should not need any modifications when removing one manufacturer's device and replacing it with a different manufacturer's device.

The SCSI Standard is designed around a client-server model of an initiator and a target. The initiator device sends commands to targets to get them to perform a task. The target is responsible for receiving commands from initiators and acting upon them. Targets devices are typically SCSI disk drives, tape drives, CD-ROMs, scanners, etc. Initiators are typically SCSI host adapters in computers.

SCSI Phases

Devices on a SCSI bus are assigned a unique identification number between zero and sixteen (older versions of SCSI support up to only seven). Normally, the host adapter is given an identification number of sixteen, but this is often configurable through software or jumper switches on the SCSI host adapter. To send a command to a target device, a SCSI host adapter, acting as an initiator, selects a target device on the SCSI bus by asserting a number of control signals on the bus. The target device acknowledges the selection and begins to receive data from the initiator. Different pieces of information are transferred between initiator and target during what are called phases of the SCSI bus. These phases include the operations (IN and OUT represent the direction that data flows relative to the initiator): COMMAND, MESSAGE IN, MESSAGE OUT, DATA IN, DATA OUT, and STATUS. The target device is responsible for moving the bus between phases by correctly asserting the SCSI bus control signals. Each of the eight phases are described below.

BUS FREE Phase

The BUS FREE phase indicates that the SCSI bus is idle and is currently unused.

ARBITRATION Phase

The ARBITRATION phase is entered when a SCSI device attempts to gain control of the SCSI bus. Arbitration can start only if the bus was previously in the BUS FREE phase. During arbitration, the arbitrating device asserts its SCSI ID on the DATA BUS. For example, if the arbitrating device's SCSI ID is 2, then the device will assert 0x04. If multiple devices attempt simultaneous arbitration, the device with the highest SCSI ID will win. ARBITRATION is a required phase in the SCSI-2 standard.

SELECTION Phase

After ARBITRATION, the arbitrating device (now called the initiator) asserts the SCSI ID of the target on the DATA BUS. The target, if present, will acknowledge the selection by raising the -BSY line. This line remains active as long as the target is connected to the initiator.

RESELECTION Phase

The SCSI protocol allows a device to disconnect from the bus while processing a request. When the device is ready, it reconnects to the host adapter. The RESELECTION phase is identical to the SELECTION phase, with the exception that it is used by the disconnected target to reconnect to the original initiator. Drivers which do not currently support RESELECTION do not allow the SCSI target to disconnect. RESELECTION should be supported by all drivers, however, so that multiple SCSI devices can simultaneously process commands. This allows dramatically increased throughput due to interleaved I/O requests.

COMMAND Phase

During this phase, 6, 10, or 12 bytes of command information are transferred from the initiator to the target.

DATA OUT and DATA IN Phases

During these phases, data are transferred between the initiator and the target. For example, the DATA OUT phase transfers data from the host adapter to the disk drive. The DATA IN phase transfers data from the disk drive to the host adapter. If the SCSI command does not require data transfer, then neither phase is entered.

STATUS Phase

This phase is entered after completion of all commands, and allows the target to send a status byte to the initiator. There are nine valid status bytes, as shown in the table below. Note that since bits 1–5 (bit 0 is the least significant bit) are used for the status code (the other bits are reserved), the status byte should be masked with 0x3e before being examined. The values indicated are after working.

| Value | Status |
|-------|--------|
| 0x00 | GOOD |
| 0x02 | CHECK CONDITION |
| 0x04 | CONDITION MET |
| 0x08 | BUSY |
| 0x10 | INTERMEDIATE |
| 0x14 | INTERMEDIATE-CONDITION MET |
| 0x18 | RESERVATION CONFLICT |
| 0x22 | COMMAND TERMINATED |
| 0x28 | QUEUE FULL |

The meanings of the three most important status codes are:

GOOD

The operation completed successfully.

CHECK CONDITION

An error occurred. The REQUEST SENSE command should be used to find out more information about the error.

BUSY

The device was unable to accept a command. This may occur during a self-test or shortly after power-up.

MESSAGE OUT and MESSAGE IN Phases

Additional information is transferred between the target and the initiator. This information may regard the status of an outstanding command, or may be a request for a change of protocol. Multiple MESSAGE IN and MESSAGE OUT phases may occur during a single SCSI transaction. If RESELECTION is supported, the driver must be able to correctly process the SAVE DATA POINTERS, RESTORE POINTERS, and DISCONNECT messages. Although required by the SCSI-2 standard, some devices do not automatically send a SAVE DATA POINTERS message prior to a DISCONNECT message.

SCSI Commands

SCSI commands are organized in structures known as Command Descriptor Blocks (CDB). They are further divided into different command groups which distinguishes the length of the CDB. For example, Group 0 CDB, Group 1 or 2 CDB and Group 5 CDB are 6, 10, or 12 bytes long respectively.

The general structure of the CDB consists of the operational code, logical unit number, command parameters and control field.

Operational Codes

The operational code is a one byte code that consists of 3 high order bits indicating the command group and the lower order 5 bits containing the command code. This is shown below.

| Bits 5–7 | Bits 0–4 |
|---|---|
| Group code | Command code |

This code is held as the first byte of the CDB.

Logical Unit Number and Command Parameters

The second byte of the CDB holds the Logical Unit Number. Only the upper 3 bits are used. The lower 5 bits normally are reserved or used for command parameters, such as a logical block addresses for direct access devices, data transfer lengths or other data relevant to the SCSI command being issued. This is shown below:

| Bits 5–7 | Bits 0–4 |
|---|---|
| Logical Unit Number | Command Parameters or reserved |

Control Field

This byte holds bit flags used in linked command operations. If the Link low order bit is set, it signifies that the CDB is part of a linked series of commands. The Flag is bit is used to specify the status code which the target returns on a successful completion of a linked command.

| Bits 6–7 | Bits 2–5 | Bit 1 | Bit 0 |
|---|---|---|---|
| Vendor-specific | Reserved | Flag | Link |

The SCSI standard includes mandatory and optional SCSI commands. In the context of NetSCSI, the important mandatory commands are Test Unit Ready, Inquiry, Request Sense, Read and Write.

The TEST UNIT ready command is used to test the target's status. If the target can accept a medium-access command (e.g., a READ or a WRITE), the command returns with a GOOD status. Otherwise, the command returns with a CHECK CONDITION status and a sense key of NOT READY. This response usually indicates that the target is completing power-on self-tests. Thus, it is only important during the Linux bootup sequence when SCSI is initialized. When this command is called by the higher-level SCSI code, dummy values are returned to it by the NetSCSI device driver instead of the normal procedure where it is send to attached SCSI devices. There are two reasons for this. Firstly, the networking code of Linux is not ready at that time of SCSI initialization, so network packets cannot be send or received. Secondly, the NetSCSI model is such that we want the NetSCSI devices to initiate the connection process so we should not know in advance which and how many NetSCSI devices there are out there. The following table shows the CDB for this command.

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Operation code (00H) | | | | | | | |
| 1 | Logical Unit Number | | | Reserved | | | | |
| 2 | Reserved | | | | | | | |
| 3 | Reserved | | | | | | | |
| 4 | Reserved | | | | | | | |
| 5 | Control Field | | | | | | | |

The INQUIRY command is used to obtain information regarding the SCSI device's make, manufacturer, model, device type and supported features. The high-level Linux code uses this command to differentiate among magnetic disks, optical disks, and tape drives. The following table shows the CDB for this command.

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Operation code (00H) | | | | | | | |
| 1 | Logical Unit Number | | | Reserved | | | | EVPD |
| 2 | Page code | | | | | | | |
| 3 | Reserved | | | | | | | |
| 4 | Allocation length | | | | | | | |
| 5 | Control Field | | | | | | | |

EVPD is a flag that instructs the device to return certain product data rather than just the general inquiry information. Which product data to return is indicated by the Page field. The amount of space to allocate for the returned data is indicated by the Allocation length field.

Like the TEST UNIT READY, INQUIRY is called during the SCSI initialization process and again dummy values are returned based on the reasons discussed previously. The data returned by INQUIRY is shown in the table below. It also shows the dummy data returned to the high-level SCSI code by the NetSCSI device driver.

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Peripheral qualifier(0) | | | Device type code (0) | | | | |
| 1 | RMB (0) | Device type modifier (0) | | | | | | |
| 2 | ISO version (0) | | | ECMA version (0) | | | ANSI approved version (2) | |
| 3 | AENC (0) | TrmIOP (0) | Reserved | | Response data format (2) | | | |
| 4 | Additional data length (159) | | | | | | | |
| 5 | Reserved | | | | | | | |
| 6 | Reserved | | | | | | | |
| 7 | RelAdr (0) | Wbus32 (0) | Wbus16 (1) | Sync (1) | Linked (1) | Reserved | CmdQue (1) | SftRe (0) |
| 8–15 | Vendor identification string ("3Com") | | | | | | | |
| 16–31 | Product identification string ("NetSCSI drive") | | | | | | | |
| 32–35 | Product revision level string ("N.1") | | | | | | | |
| 36–55 | Vendor-specific information string ("9/2/99") | | | | | | | |
| 56–95 | Reserved | | | | | | | |
| 96–end | Vendor-specific data ("© Copyright 1999") | | | | | | | |

The Peripheral qualifier specifies whether there is a device attached to the logical unit that was send the INQUIRY command. Device type code indicates the type of device attached. In this case, it is a direct access device. Other devices would have different device type code. RMB indicates removable media. Device type modifier is meant only for backward compatibility. ISO, ECMA and ANSI version fields indicate the device's support of the respective standards. In this case, only the ANSI SCSI-2 version is supported. AENC and TrmIOP are for support of asynchronous event notification and the Terminate I/O Process message. Response data format indicate that this inquiry data structure conforms to SCSI-2 standard. Additional data length shows the available data that can follow the standard inquiry data header. Byte 7 shows the various support of the device: relative addressing (RelAdr), 32-bit Wide SCSI (Wbus32), 16-bit Wide SCSI (Wbus16), synchronous data transfer (Sync), command linking (Link), command queuing (CmdQue), and soft reset (SftRe). The subsequent fields are meant to contain vendor and product specific information. These can be seen during the Switch PC bootup process.

Thus, the NetSCSI device is a direct access device. It conforms to ANSI standard for SCSI-2, and the data format also supports SCSI-2. It has support for 16-bit Wide SCSI, synchronous data transfer, linked commands and command queuing.

The REQUEST SENSE command: Whenever a command returns a CHECK CONDITION status, the high-level Linux SCSI code automatically obtains more information about the error by executing the REQUEST SENSE. This command returns a sense key and a sense code (called the "additional sense code," or ASC, in the SCSI-2 standard). Some SCSI devices may also report an "additional sense code qualifier" (ASCQ). The 16 possible sense keys are described below.

| Sense Key | Description |
|---|---|
| 0x00 | NO SENSE |
| 0x01 | RECOVERED ERROR |
| 0x02 | NOT READY |
| 0x03 | MEDIUM ERROR |
| 0x04 | HARDWARE ERROR |
| 0x05 | ILLEGAL REQUEST |
| 0x06 | UNIT ATTENTION |
| 0x07 | DATA PROTECT |
| 0x08 | BLANK CHECK |
| 0x09 | (Vendor specific error) |
| 0x0a | COPY ABORTED |
| 0x0b | ABORTED COMMAND |
| 0x0c | EQUAL |
| 0x0d | VOLUME OVERFLOW |
| 0x0e | MISCOMPARE |
| 0x0f | RESERVED |

The READ and WRITE commands are used to transfer data from and to the target. They are the workhorse of all the SCSI commands. These commands have a 6-byte and 10-byte version. The latter permits greater data transfer lengths and addressing to be specified. It also has fields to indicate cache handling and relative addressing. Since the 10-byte commands are more useful, they shall be explained in greater detail. The table below shows the CDB for READ(10).

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Operation code (28H) | | | | | | | |
| 1 | Logical unit number | | | DPO | FUA | Reserved | | RelAdr |
| 2 | Logical block address | | | | | | | |
| 3 | Logical block address (continued) | | | | | | | |
| 4 | Logical block address (continued) | | | | | | | |
| 5 | Logical block address (continued) | | | | | | | |
| 6 | Reserved | | | | | | | |
| 7 | Transfer Length | | | | | | | |
| 8 | Transfer Length (continued) | | | | | | | |
| 9 | Control field | | | | | | | |

A disable page out (DPO) bit of one indicates that the target shall assign the logical blocks accessed by this command the lowest priority for being fetched into or retained by the cache. A DPO bit of one overrides any retention priority specified in the cache page. A DPO bit of zero indicates the priority shall be determined by the retention priority fields in the cache page.

A force unit access (FUA) bit of one indicates that the target shall access the media in performing the command prior to returning GOOD status. Read commands shall access the specified logical blocks from the media (i.e. the data is not directly retrieved from the cache). In the case where the cache contains a more recent version of a logical block than the media, the logical block shall first be written to the media. An FUA bit of zero indicates that the target may satisfy the command by accessing the cache memory. For read operations, any logical blocks that are contained in the cache memory may be transferred to the initiator directly from the cache memory.

The following table shows the CDB for a WRITE(10) command. It is very similar to the READ(10) command. The meanings for DPO and FUA are similar to the READ(10) command. The differences are explained below.

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Operation code (2AH) | | | | | | | |
| 1 | Logical unit number | | | DPO | FUA | Reserved | | RelAdr |
| 2 | Logical block address | | | | | | | |
| 3 | Logical block address (continued) | | | | | | | |
| 4 | Logical block address (continued) | | | | | | | |
| 5 | Logical block address (continued) | | | | | | | |
| 6 | Reserved | | | | | | | |
| 7 | Transfer Length | | | | | | | |
| 8 | Transfer Length (continued) | | | | | | | |
| 9 | Control field | | | | | | | |

A force unit access (FUA) bit of one for Write commands indicates that it hall not return a GOOD status until the logical blocks have actually been written on the media (i.e. the data is not write cached). If FUA is of bit zero, logical blocks may be transferred directly to the cache memory. GOOD status may be returned to the initiator prior to writing the logical blocks to the medium. Any error that occurs after the GOOD status is returned is a deferred error, and information regarding the error is not reported until a subsequent command.

RAID

RAID can be implemented in either hardware or software. For hardware, it is through special disk controllers. In software, it is through a kernel module that is layered in between the low-level disk driver, and the file system which sits above it. RAID hardware is always in the form of a disk controller. A device which one can cable up the disk drives. It often comes in the form of an adapter card that will plug into a ISA/EISA/PCI/S-Bus/MicroChannel slot.

RAID controllers that are smaller can fit into a drive bay; larger ones may be built into a storage cabinet with its own drive bays and power supply. The cost of using the latest RAID hardware with the most advanced CPU to provide the best overall performance, will be very high. This is because most RAID controllers come with on-board DSP's and memory cache that can off-load considerable amount of processing from the main CPU, as well as allow high transfer rates into the large controller cache. For RAID which incorporates parity checks (for protection against disk-failure), parity calculations are done in RAID hardware which speeds up processing considerably. RAID hardware offers an advantage over pure software RAID, in that it potentially can make use of disk-spindle synchronization and its knowledge of the disk-platter position with regard to the disk head (scheduling), and the desired disk-block. RAID hardware is usually not compatible across different brands, makes and models: if a RAID controller fails, it must be replaced by another controller of the same type.

Initial implementation efforts for the present invention involved Windows NT NetSCSI device drivers to a Linux operating system with RAID support in software. Software RAID in Linux is implemented as a set of kernel modules along with management utilities (raidtools) that implement RAID purely in software. All this happens without any additional hardware. The Linux RAID subsystem is implemented as a layer in the kernel that sits above the low-level disk drivers (for IDE and SCSI drives), and the block-device interface. The filesystem sits above the block-device interface. The advantage of software RAID over hardware RAID is that its software nature allows it to be more flexible than a hardware solution. The disadvantage is that it needs more CPU cycles and power to run well than a comparable hardware system. Another major advantage over hardware is that of cost. Futhermore, software RAID operates on a partition-by-partition basis using individual disk partitions combined together to create a RAID partition. This is opposed to the way hardware RAID is implemented which combines disk drives into an array.

For one embodiment of the present invention, a switch acted as the entry point for the user. The user issued commands at the switch PC to access the NetSCSI disk drives. This embodiment was limited to one user, as a study of porting of Windows NT NetSCSI to Linux. The embodiment of this NetSCSI system is illustrated in FIG. 10.

The user who wants to access data from a NetSCSI disk drives enters a command at the switch PC. The switch sends the message to the target drive 1001 which responds with an acknowledgment message and any data if it was requested 1002.

NetSCSI Architecture

The Linux platform uses a layered approach in its design as shown in FIG. 1.1. The command which the user inputs (application layer 1101) will be passed on down to the kernel layer where it will be interpreted by the switch PC's file system. The file system 1102 will pass it on to the block interface 1103 where it will determine that the device to be access is a SCSI device. As a result, it will pass the request to the SCSI layer 1104 of the kernel. The SCSI layer will issue SCSI commands to the SCSI device driver. It is in the SCSI device driver where the magic works. The Net=SCSI device driver 1105 will take the SCSI command and encapsulated it in a Storage Transport Protocol (STP 1106). The NetSCSI datagram is transmitted by calling either Ethernet or User Datagram Protocol (UDP). The Ethernet implementation uses raw sockets 1109 while the UDP 1107 implementation uses IP 1108 to send the packets. These shall be discussed in more detail shortly. The decision as to which is used is made during compilation time of the Linux kernel. It is transparent to the user who should not care about which of the two protocols is being used.

Linux NetSCSI Daemon

On the NetSCSI disk drive side, this embodiment runs the Linux NetSCSI daemon, which is a user-level network daemon. It listens on a socket and passes NetSCSI packets to a SCSI generic interface, which will access the SCSI disk drives. It comes in two flavors: one for Ethernet and the other for UDP implementation. Refer to the daemon source code and the SCSI PROGRAMMING HOWTO at http://howto.tucows.com/LDP/HOWTO/SCSI-Programming-HOWTO.html for a better understanding of how it works. The source code is quite self-explanatory.

NMP

The Linux NetSCSI implemented in this project works under the supervision of a Network-Attached Storage (NAS) Management Protocol (NMP). The function of NMP is to perform auto-detection and auto-mounting of NetSCSI disk drives to the switch. Part of this process involves mapping the SCSI device ID/LUN designations on the switch PC to the NetSCSI disk drive's network address; ethernet implementation uses only hardware addresses while UDP implementation uses IP address. This is needed when SCSI commands are issued so that the NetSCSI device driver knows which NetSCSI disk drives it is for.

NetSCSI RAID

RAID allows the combination of multiple disk drives to improve performance and/or reliability. The publicly distributed Linux NMP did not implement RAID automatically.

Figure 12:
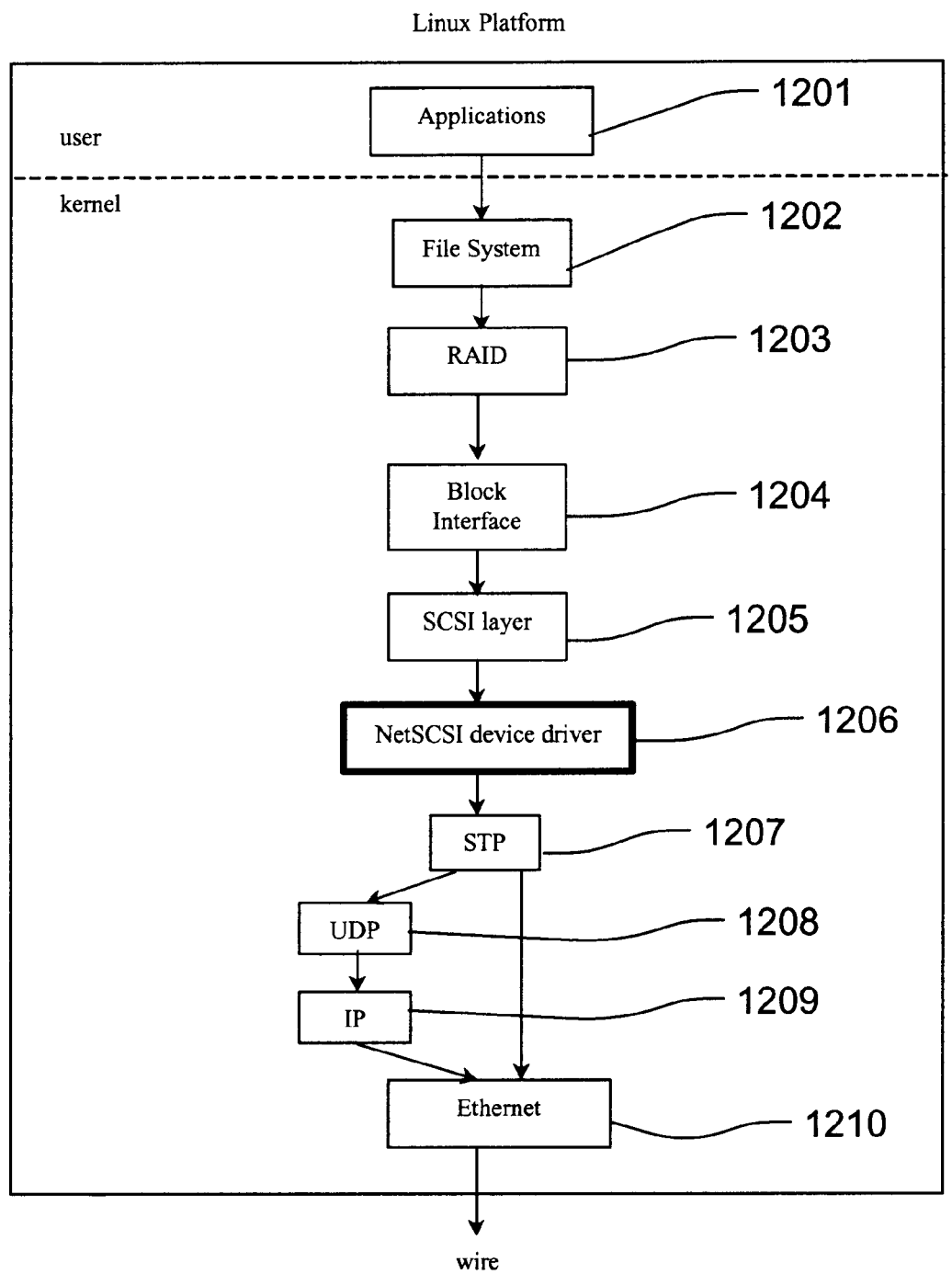
FIG. 12 depicts an implementation of RAID on a Linux platform.

RAID on NetSCSI allows the NetSCSI disks to be viewed as one single large disk. This makes it easier for a user who would only care that there is one disk to access and not have to access NetSCSI disks individual consciously. The RAID layer comes between the filesytem and the block layer. FIG. 12 illustrates this.

Implementation Details

The Linux NetSCSI implementation abstracts the Linux kernel from knowing that SCSI commands are sent to the network by using a virtual SCSI host adapter. The fact that the SCSI devices are remotely attached is unimportant to the Linux. The Linux kernel will only thinks that it is sending SCSI requests through a SCSI device driver to locally mounted SCSI devices. It is the device driver that will receive the SCSI requests and redirect them to the networking code.

A virtual SCSI host adapter does not require an actual SCSI host adapter controller. The work is done through software. A SCSI device driver has been developed based on the Adaptec model 174x SCSI host adapter board that has now been discontinued by Adaptec. This device driver was chosen because it offered the essential functionality of a SCSI device driver without being too complicated to be converted for NetSCSI implementation. The source code adapted from the Adaptec 174x SCSI host adapter is known as the aha1740 source code. The NetSCSI aha1740 device driver works in tandem with STP. The STP is in effect the heartbeat of NetSCSI.

The important data structures and functionality of the NetSCSI aha1740 device driver are described next.

NetSCSIContext

Figure 13:
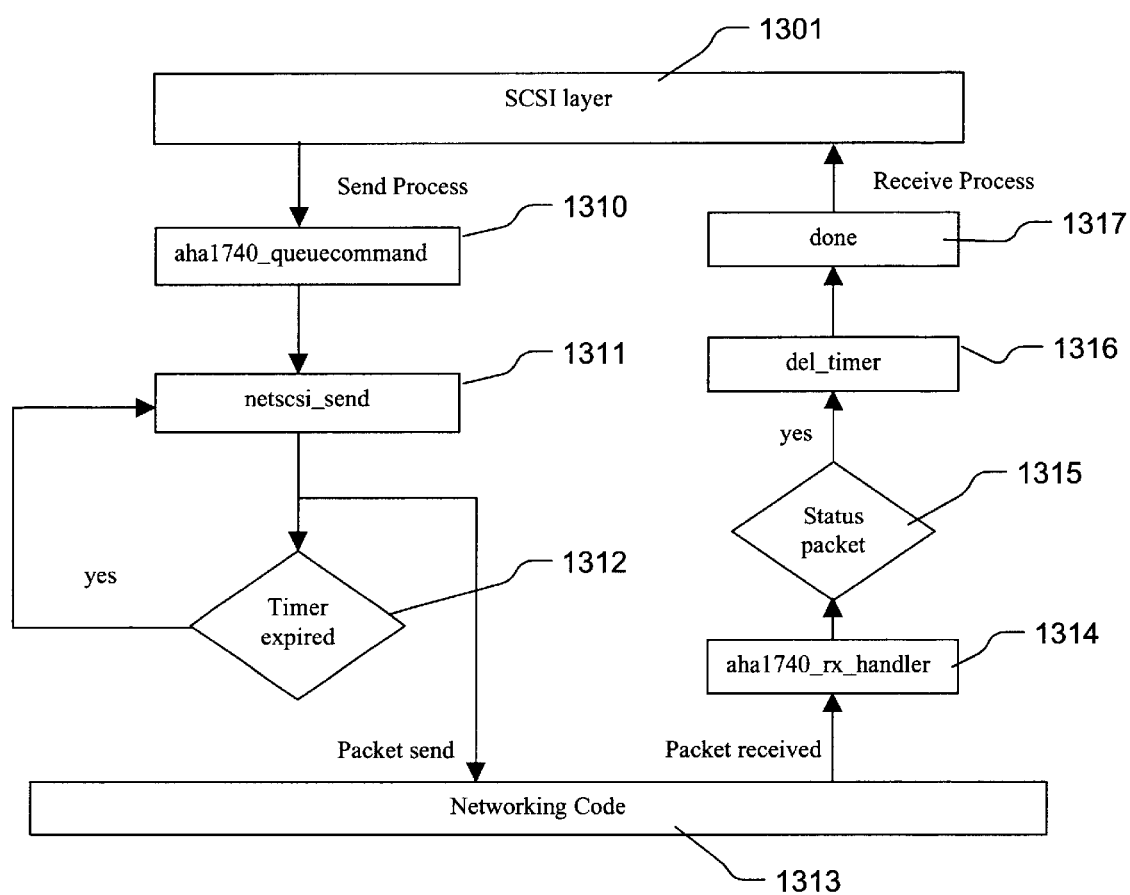
FIG. 13 is a flowchart illustrating sending and receiving processes for a NetSCSI device driver.

NetSCSIContext is a data structure that acts as a control block, which contains a pointer to the SCSI command, issued from the SCSI layer. FIG. 13 shows a partial NetSCSIContext data structure for Ethernet implementation. It also holds a pointer to the STP header as well as variables useful to STP is to be transferred. There is a timer function for the purpose of retransmission. This provides some reliability to the transmission. For both the Ethernet and UDP implementation, the NetSCSIContext data structure is customized for each purpose. For example, the Ethernet implementation has it having a pointer to the Ethernet header, which the UDP implementation does not need. Finally, there are variables which provide the mapping information between the SCSI command and the NetSCSI drive ID/LUN or IP address. This allows the NetSCSI device driver to know which NetSCSI drive the SCSI command is directed to.

A one-dimensional array of NetSCSIContext's is initialized when the NetSCSI aha1740 device driver is loaded. There is one NetSCSIContext for every potential NetSCSI drive. In this project, seven NetSCSIContext's were initialized to allow for a maximum of seven NetSCSI drives to be connected. Of course, this number can be adjusted if needed.

The NetSCSIContext is very similar to the Enhanced Control Block (ECB) found in the original Adaptec aha1740 code. ECB is Adaptec's control structure. ECB's are used to accommodate multiple SCSI commands arising from the use of queued SCSI commands. NetSCSIContext works in similar fashion. The important difference being that NetSCSIContext is used to handle multiple NetSCSI disk drives rather than queued SCSI commands. However, the concept of queued commands can also be implemented to NetSCSIContext. This can be done be declaring a two-dimensional array for NetSCSI. The second element in the array is the number of commands queuable. The following is a partial NetSCSIContext:

```
typedef struct __NetSCSIContext {
  Scsi_Cmnd *SCpnt;
  stp_header *STPHeader;
  u32 TotalDataLen;
  u32 TransactionID;
  u32 SeqNum;
  char *buf;
  struct timer_list timer;
  struct ethhdr *eth;
  int id;
  int lun;
  long ip
} NETSCSI_CONTEXT;
```

Functionality of the NetSCSI AHA1740 Driver

There are two versions of the Linux NetSCSI code: Ethernet and UDP. Some of the functionality of the NetSCSI aha1740 driver is common to both.

aha1740_queuecommand( )

This is work horse function of the device driver. This function is used in the original aha1740 code to handle queued SCSI commands. It has been adapted to handle SCSI commands for multiple NetSCSI disk drives. The queuecommand( ) function takes a SCSI command and a done( ) function as arguments from the high-level SCSI layer and partially processes the SCSI command to be ready for network transmission before returning.

Before returning, the queuecommand( ) function must first determine which NetSCSI disk drive the SCSI command is targeted for. It does this by mapping the SCSI command's ID/LUN to the NetSCSIContext that has been set to handle that SCSI commands for that NetSCSI disk drive. The NetSCSIContext would contain the network address of the NetSCSI disk drive. This assignment should have been previously done by NMP using aha1740_set( ).

It saves a pointer to the SCSI command and the done( ) function to NetSCSIContext so that NetSCSIContext will know that this SCSI command belong to it during the receiving process.

After this, queuecommand( ) has to determine the direction of data transfer the SCSI command specifies and using this information, initialize the STP command header with the appropriate parameters.

Before actually calling the sending function, the timer function in the NetSCSIContext is first initialized. This is a retransmission timer; the purpose is to allow for an automated retransmit of the sending process if a response is not received after a certain elapsed time. This is a very simple retransmission timer in that it uses a fixed constant as the expiry time. More sophisticated timers using exponential backoff algorithms (as in TCP) could also be used. In this embodiment, retransmission was very rare. The advantages offered by a more sophisticated retransmission were outweighed for a simpler design.

There are four cases where a retransmission can occur: (1) packet loss, (2) packet is still on its way to the NetSCSI drive, (3) the packet is received and a respond is on its way back but has not been received by the switch, (4) the packet is received but is rejected for whatever reasons. For the first and last case, a retransmission serves the purpose. The second and third case would result in duplicate packets when retransmission occurs. Fortunately, the Linux daemon on the NetSCSI disk drives is able to handle duplicate packets so this poses no problem.

The queuecommand( ) will then call netscsi_send( ) to do the actual passing of the SCSI command to the networking code.

The queuecommand( ) function is called only if the can queue variable is non-zero. Otherwise the command( )

function is used for all SCSI requests. The command( ) function was not used due to some problems resolving interrupts. But using the queuecommand( ) allows the possibility of using queued SCSI commands in NetSCSI, a performance booster. The queuecommand( ) function should return zero on success.

netscsi_send( )

This function does the job of sending the SCSI command down to the networking code. It is called by queuecommand( ), and also netscsi_timer( ) when there is a retransmission. The Ethernet and UDP implementation both have very different ways of implementing this process from each other.

UDP

The UDP implementation does the equivalent of send to system-call. It utilizes the destination IP address, port number, pointer to STP command packet header from NetSCSIContext and sends out the packet by calling sock_sendmsg( ). The socket that it uses was initialized during bootup and is used throughout globally to send and receive the UDP packets.

If the SCSI command is a write command, the step above is repeated for data transmission except for changing the STP command packet header to a STP data packet header and copying the data behind the STP header. If the data is larger than the maximum datagram size, it is fragmented.

Ethernet

The Ethernet implementation first allocates a socket buffer (struct sk_buff) from memory and creates the network headers (hardware address and STP headers) in its data buffers. If the SCSI command is a write, then it must also format the data behind the network headers with the necessary fragmentation to accommodate the maximum size of the STP datagram. Documentation on implementing Linux network buffers can be found from an article by Alan Cox at http://reference.cymru.net/~alan/Documents/buffers.html.

netscsi_timer( )

This is the function, which the retransmit timer calls when the timer expires. It is used to retransmit the SCSI command if it is not completed after a certain elapsed time. Such an occurrence might mean that the first packet transmitted was lost. If however, it was because of a longer than expected processing time on the SCSI device. The retransmitted packet poses no problem as the Linux daemon code on the SCSI devices is able to handle duplicate packets. Besides retransmitting the original packet, it also resets the timer in preparation for another retransmit if the first retransmit should also be called. Usually, the retransmit is not called during normal usage. This is because when the SCSI command is successfully completed, aha1740_rx_handler( ) kills the particular retransmit timer of the SCSI command.

aha1740_rx_handler( )

The job of this function is to receive packets from the networking code and passing it to the high-level SCSI interface. It checks to see whether the packet received is in the proper order and size. If the STP header indicates a data packet, it copies any data to the SCSI command buffer. Once it receives a STP status packet, it signals the completion of the SCSI command calls the SCSI done( ) function which tells the high-level SCSI code that this SCSI command has completed. The done( ) function is called with the SCSI command as a parameter. Since the done( ) function is called separately by a receive function, it allows the SCSI command to be executed in an interrupt-driven fashion. It also frees the network buffer(struct sk_buff) by calling kfree_skb( ).

A special mention to future workers of NetSCSI is that if done( ) is called, it should be the last function called before returning, otherwise due to the scheduling nature of kernel code, the sequence of execution of functions might not turn out the way you want.

Packets are queued by calling netif_rx( ) and the bottom half handler is informed by calling mark_bh( ). The ethernet implementation calls aha1740_rx_handler( ) from the bottom half handler, netbh( ), whenever a packet which has a NetSCSI packet-type is detected. UDP calls it from udp_queue_rcv_skb( ).

aha1740_detect( )

This function is only called during the setup process for SCSI. It is used to inform the high-level SCSI code of the specifications of the virtual SCSI host adapter card. For example, it is used to indicate the queuecommand( ) is to be used. It is used in NetSCSI to initialize the NetSCSI control block (NetSCSIContext) which is used for the processing of SCSI commands. Memory is set aside by calling kmalloc to allocate memory for each NetSCSIContext. Part of the STP header is also initialized here.

aha1740biosparam( )

The bios_param( ) function was introduced in an attempt to provide access to the host adapter geometry information. The ip parameter points to an array of three integers that the bios_param( ) function will fill in before returning:

ip[0]: Number of heads
ip[1]: Number of sectors per cylinder
ip[2]: Number of cylinders The information in info is not the physical geometry of the drive, but only a logical geometry that is identical to the logical geometry used by MS-DOS to access the drive. This function is only called during the SCSI setup sequence during the bootup process. As mentioned, since the SCSI devices cannot be detected at this time, the values returned are dummy values.

aha1740_abort( )

The abort( ) function is used to request that the currently outstanding SCSI command, indicated by the Scsi_Cmnd pointer, be aborted. Currently, this function returns SCSI_ABORT_SNOOZE which tells the higher-level SCSI code that the driver did not do anything for the abort and to wait for more time for the SCSI command to complete. This function is called if the retransmit timer fails to produce a result from the disk. If nothing still happens, aha1740_reset( ) will be called.

aha1740_reset( )

This command is called when the higher-level SCSI code does not receive a SCSI completion command after a SCSI reset timeout. This will only be called after SCSI abort is called and if that does not solve the problem. For the NetSCSI implementation, there is no proper reset function, a SCSI_RESET_PUNT is simply returned when it is called. This means that the driver does not know how to reset the bus, or it does not want to. The higher-level SCSI code will then request for request sense information to decide how to proceed from here.

aha1740_set( )

This function performs the association of SCSI id/luns to the NetSCSI drive's network address. NMP will detect NetSCSI drives which is trying to get connected and will take their IP address and perform a socket option in ip_setsockopt( ) to call this function to perform its task. It will register the IP with the appropriate NetSCSIContext so that the device driver knows which NetSCSI disk SCSI commands are trying to access and proper transmission of packets.

Sending and Receiving Processes

This is the main process carried out by the NetSCSI device driver during its normal operation. FIG. 13 shows a flowchart illustrating the sending and receiving process and the routines that are called in the aha1740 code.

Send Process

The send process begins when aha1740_queuecommand( ) 1310 is called from internal_cmnd( ) in SCSI layer. It essentially prepares the SCSI command for packet transmission before calling netscsi_send( ) 1311 which does the actual sending of the packet into the networking code. The timer 1312 which was first activated in aha1740_queuecommand( ) will continually re-send the packet until it gets a response from the NetSCSI drive it addressed.

Receive Process

As mentioned earlier, packets are queued by calling netif_rx( ) and the bottom half handler is informed by calling mark_bh( ). The Ethernet implementation calls aha1740_rx_handler( ) 1314 from the bottom half handler, netbh( ), whenever a packet which has a NetSCSI packet-type is detected in the networking code 1313. UDP calls it from udp_queue_rcv_skb( ) 1314. Aha1740_rx_handler( ) will store all STP data packets in a buffer until it receives a STP status packet 1315. When it is received, it signifies the end of the response from the target device due to the SCSI command. Aha1740_rx_handler( ) will call del_timer( ) 1316 to deactivate the retransmit timer to stop resending the packet since the command has already completed. It finally calls done( ) 1317 to indicate to the SCSI layer 1301 that the SCSI command has completed.

NMP NetSCSI Load Process

As mentioned in the previous chapter, the Linux NetSCSI implemented in this project works under the supervision of NMP which performs auto-detection and auto-mounting of NetSCSI disk drives to the switch. This section will explain the NMP processes that interact with NetSCSI to map SCSI device ID/LUN designations on the switch PC to the NetSCSI disk drive's network address.

Figure 14:
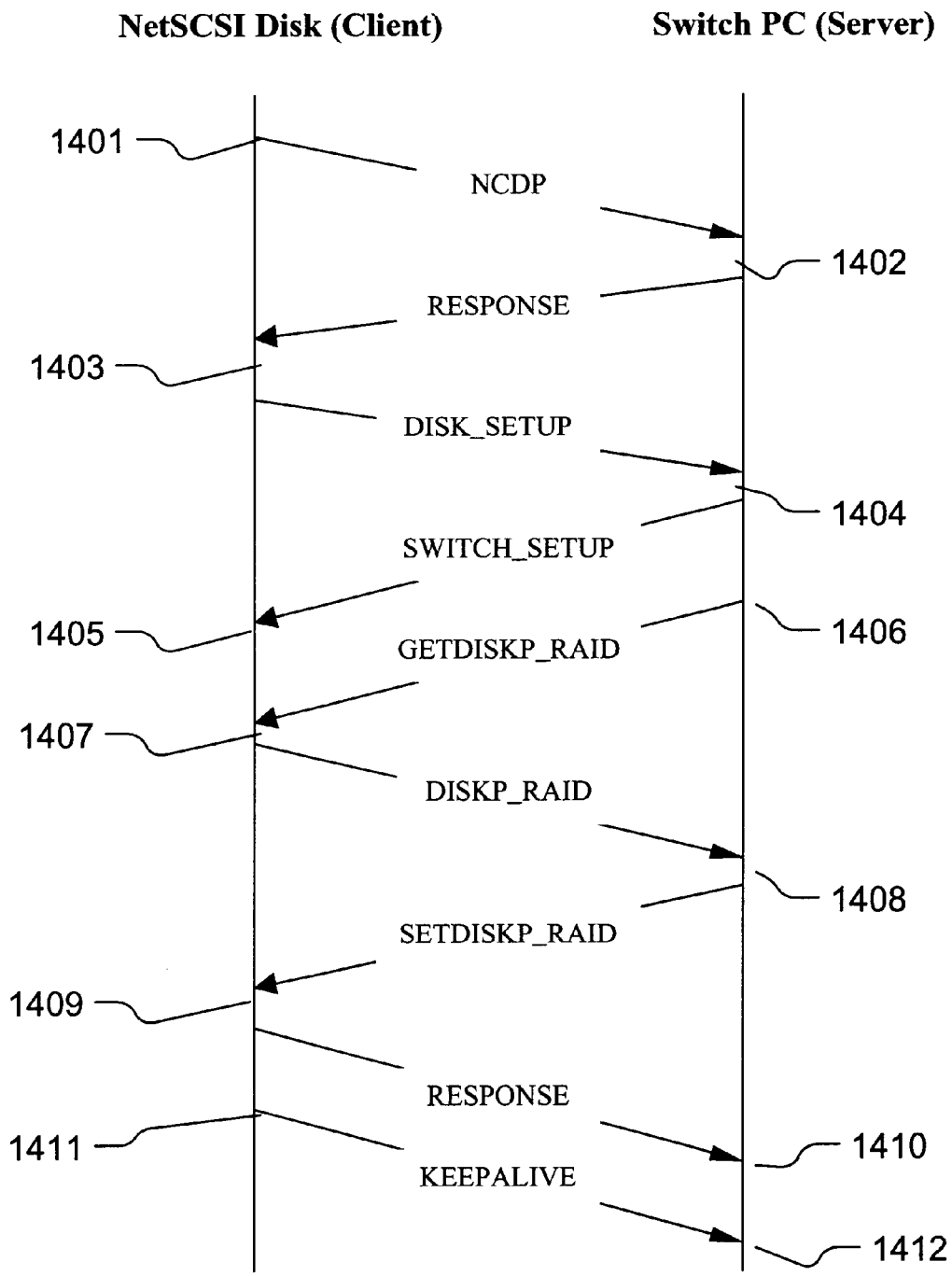
FIG. 14 illustrates a sequence of messages by which a NetSCSI disk may initiate a session.

FIG. 14 illustrates the sequences of messages that occur when the NetSCSI disk initiates the connection establishment. It does this by first using the NAS Controller Detection Protocol (NCDP) 1401, 1402 through a IP multicast broadcast to detect the presence of the switch controller 1402, 1403. Once, the switch finds a NetSCSI disk seeking contact, it registers its IP address and NMP takes over to handle the management process. When this happens, the NetSCSI disk (client) issues the DISK_SETUP message to the switch PC (server) 1403, 1404 which will respond with SWITCH_SETUP message 1404, 1405. These messages establish initial contact between client and server. The client uses DISK_SETUP 1403, 1404 to inform the server the about disk information, including the support of NetSCSI protocol. The server will follow up with a GETDISKP_RAID 1406, 1407 in support of NetSCSI to get disk parameters. The client responds with DISKP_RAID 1407, 1408 which passes some information, the most important being the filesystem type to support. On reception of the message, the server calls switch_raid_add( ) which calls setsockopt( ) which calls aha1740_set( ) to map the SCSI ID/LUN to the network address of the NetSCSI drive. For UDP implementation, the network address is simply the IP address that was captured in the earlier process. For Ethernet implementation, the MAC address is obtained through Address Resolution Protocol (ARP). This is how the NetSCSI driver will know which NetSCSI disk SCSI commands are to be issued to. Once this is done, the server will do FDISK and mount the NetSCSI disk to it with the specified filesystem. It will next issue SETDISKP_RAID 1408, 1409 to inform the client what SCSI ID/LUN and filesystem it registered. The client will call a RESPONSE 1409, 1410 and KEEPALIVEs 1411, 1412 will occur to detect the event of a failed disk.

Performance

Some performance analysis of NetSCSI has been conducted using disk I/O benchmarks. The benchmark used was known as Bonnie. A detailed explanation of what Bonnie does and how it works can be found from the website http://www.textuality.com/bonnie.

Bonnie was used to perform a series of tests on a file of known size. If the size is not specified, Bonnie uses 100 Mb. For the test to be useful, the file size should be much bigger than the available RAM, thereby forcing real transfers between user space and the physical disk. For each test, Bonnie reported the bytes processed per elapsed second, per CPU second, and the % CPU usage (user and system). The Bonnie benchmark program included three tests: sequential output, sequential input and random seeks on the drive system.

Sequential output was performed per-character using the putc( ) stdio macro. The CPU overhead required by the stdio code included OS file space allocation. A second test was performed per block using write(2). The CPU overhead again included the OS file space allocation. Finally rewrite was performed where each chunk (currently, the size is 16384) of the file was read with read(2), dirtied, and rewritten with write(2), requiring an lseek(2). Since no space allocation was done, and the I/O was well-localized, this tested the effectiveness of the filesystem cache and the speed of data transfer.

Sequential input was tested per-character using the getc( ) stdio macro. The block test was done using read(2). This tested sequential input performance.

Random seeks runs SeekProcCount (currently 4) processes in parallel, doing a total of 4000 lseek( )s to locations in the file computed. The block was read with read(2). In 10% of cases, it was dirtied and written back with write(2).

Test System Setup

The test system setup consisted of a switch PC and a NetSCSI disk system connected through a hub. The system specifics are given below.

Switch PC

System: Dell with PIII 500 (nas39)
RAM: 128 MB
NIC: 3Com 3c905B Cyclone 100baseTx
IDE Hard Disk: Maxtor 91024D4 10,240 MB, Integrated Controller ATA-4/Ultra DMA, Buffer Size 512 KB, Buffer Type SDRAM

| IDE Maxtor 91024D4_Disk Performance Specifications | |
|---|---|
| Average Seek Times | 9.0 ms |
| Maximum Seek Times | <20 ms |
| Average Latency | 4.18 ms |
| Rotation Speed (±0.1%) | 7200 RPM |
| Internal Data Transfer Rate | 33.0 Mbits/sec |

Refer to ftp://ftp.maxtor.com/pub/ide/dm5120d.txt for further specifications. NetSCSI Disk System
System: Gateway with PII 266 (trouble)
RAM: 32 MB
NIC: 3Com 3c905B Cyclone 100baseTx
SCSI Controller: Adaptec AHA-294X Ultra
SCSI Hard Disk: SEAGATE ST32430N Rev. 0594 2.14 GB Buffer Size 512 KB

| SCSI SEAGATE ST32430N Disk Performance Specifications | |
|---|---|
| Average Seek Times | 10.4 ms |
| Maximum Seek Times | <13.4 ms |
| Average Latency | 5.54 ms |
| Rotation Speed (±0.5%) | 5411 RPM |
| Internal Data Transfer Rate | 35.8 Mbits/sec |

Results

The Bonnie benchmark was ran once for each particular implementation. It was found that the variance arising from different runs for each implementation was small (less than an order of a magnitude) so one instance of bonnie results was sufficient to represent the general results. The output Bonnie produced for each implementation appears below.

0.3
When writing the 200-Mb file using efficient block writes, the operating system reported that this work consumed 0.3% of one CPU's time.
140
While running through the 200-Mb file just creating, changing each block, and rewriting, it, Bonnie recorded an ability to cover 140 K per second.
0.3
While running through the 200-Mb file just creating, changing each block, and rewriting, it, the operating system reported that this work consumed 0.3% of one CPU's time.
268
While reading the file using 200 million getc( ) macro invocations, Bonnie recorded an input rate of 268 K per second.
0.9
While reading the file using 200 million getc( ) macro invocations, the operating system reported that this work consumed 0.9% of one CPU's time.
286
While reading the file using efficient block reads, Bonnie reported an input rate of 286 K per second.
0.2
While reading the file using efficient block reads, the operating system reported that this work consumed 0.2% of one CPU's time.

| UDP | | Sequential Output | | | | | | Sequential Input | | | | Random | |
|---|---|---|---|---|---|---|---|---|---|---|---|---|---|
| | | Per Char | | Block | | Rewrite | | Per Char | | Block | | Seeks | |
| Machine | MB | K/sec | % CPU | K/sec | % CPU | K/sec | % CPU | K/sec | % CPU | K/sec | % CPU | /sec | % CPU |
| nas239 | 200 | 331 | 1.6 | 318 | 0.3 | 140 | 0.3 | 268 | 0.9 | 286 | 0.2 | 39.1 | 0.3 |

(a)

| Ethernet | | Sequential Output | | | | | | Sequential Input | | | | Random | |
|---|---|---|---|---|---|---|---|---|---|---|---|---|---|
| | | Per Char | | Block | | Rewrite | | Per Char | | Block | | Seeks | |
| Machine | MB | K/sec | % CPU | K/sec | % CPU | K/sec | % CPU | K/sec | % CPU | K/sec | % CPU | /sec | % CPU |
| nas239 | 200 | 345 | 1.6 | 477 | 0.5 | 145 | 0.3 | 306 | 1.1 | 310 | 0.3 | 35.0 | 0.3 |

(b)

To understand what the output means, an interpretation of the output for UDP is as follows:
nas39
The name of the machine Bonnie ran on.
200
Bonnie used a 200-Megabyte file to do the testing.
331
When writing the file by doing 200 million putc( ) macro invocations, Bonnie recorded an output rate of 331 K per second.
1.6
When writing the file by doing 200 million putc( ) macro invocations, the operating system reported that this work consumed 1.6% of one CPU's time.
318
When writing the 200-Mb file using efficient block writes, Bonnie recorded an output rate of 318 K per second.

39.1
Bonnie created 4 child processes, and had them execute 4000 seeks to random locations in the file. On 10% of these seeks, they changed the block that they had read and re-wrote it. The effective seek rate was 39.1 seeks per second.
0.3
During the seeking process, the operating system reported that this work consumed 0.3% of one CPU's time.

As a means of comparison, Bonnie was also tested out a NFS mounted disk (using a Starbase directory) and the local IDE hard drive on the Switch PC. The output Bonnie produced for these implementations was:

|  |  | Sequential Output | | | | | | Sequential Input | | | | Random | |
|---|---|---|---|---|---|---|---|---|---|---|---|---|---|
| NFS | | Per Char | | Block | | Rewrite | | Per Char | | Block | | Seeks | |
| Machine | MB | K/sec | % CPU | K/sec | % CPU | K/sec | % CPU | K/sec | % CPU | K/sec | % CPU | /sec | % CPU |
| nas239 | 200 | 247 | 1.2 | 185 | 0.2 | 273 | 0.5 | 865 | 3.2 | 865 | 0.9 | 74.7 | 0.7 |

(a)

|  |  | Sequential Output | | | | | | Sequential Input | | | | Random | |
|---|---|---|---|---|---|---|---|---|---|---|---|---|---|
| Local | | Per Char | | Block | | Rewrite | | Per Char | | Block | | Seeks | |
| Machine | MB | K/sec | % CPU | K/sec | % CPU | K/sec | % CPU | K/sec | % CPU | K/sec | % CPU | /sec | % CPU |
| nas239 | 200 | 13462 | 63.7 | 16986 | 17.3 | 4589 | 9.7 | 11719 | 39.9 | 13996 | 10.3 | 195.0 | 1.6 |

(b)

Bonnie is a "ballpark" measurement of the performance offered by NetSCSI. The results show that compared to local hard drive performance, NetSCSI is behind. This is to be expected since local tests use PCI buses. Furthermore, by comparing the IDE hard disk and the NetSCSI SCSI hard disk, the IDE hard disk outperforms the SCSI disk in many areas.

Comparing NetSCSI's performance with NFS shows some promising results. Sequential output is better for NetSCSI than NFS—indicating it is better at reading data. However, a look at the sequential input and random seeks reveal NFS performance is better. A closer examination indicates some inconsistencies here as these values seem rather high compared to their output counterpart. NetSCSI and local values have similar values between their outputs and inputs.

NFS was designed to handle file transfers quickly with the original goal for an NFS-mounted filesystem to provide performance equivalent to 80% of the performance expected from a locally-mounted hard disk. Hence, NFS disk drives on dedicated servers are typically amongst the fastest available in order to reduce bottlenecks at the drive end. The increase performance seen in sequential input and random seeks for NFS could have arisen from the better performing NFS drives. Their caching capacity and speed is probably far superior to those found on NetSCSI.

Bootup of Linux (Initialization)

One of the problems encountered when booting up the Linux kernel with the amended aha1740 code is that the code contains the initialization of some data structures which needed network data structures. However, the normal bootup sequence, described in device_setup( ), calls the SCSI initialization sequence, scsi_dev_init( ), before the network bootup sequence, net_dev_init( ). This caused the kernel to crash during bootup as NULL pointers (from uninitialized network data structures) are dereferenced. The solution to this was to switch the bootup sequence between SCSI and the network, thus having the kernel call net_dev_init( ) before scsi_dev_init( ). This solves the problem of dereferencing NULL pointers and does not appear to have any other side-effects. The reason for this is that in most cases, SCSI and networking code are independent of each other.

Another problem encountered during SCSI bootup was that the high-level SCSI code issued commands to test and detect SCSI devices during the bootup sequence, before the network interface card on the switch machine had started. Thus, any network-attached SCSI devices could not be detected. One way around this was to return dummy values to the high-level SCSI code when it called for detection and initialization of attached SCSI devices, allowing up to a maximum number of SCSI devices to be detected. The actual SCSI devices were later be mounted to the switch once the NIC on the switch was up. SCSI commands were issued through the queuecommand( ) function.

At the bootup stage, any SCSI hard drives detected through returning dummy values should be queried for their partion tables. This information cannot be returned in any detail at this stage so only a successly completed result response is returned but without any data. The high-level block layer will simply indicate it is an unknown partition table. The actual partition table is passed when FDISK is called later.

Error Handling with STP

The original Linux NetSCSI daemon did not implement the error handling properly as described in the STP documents. Whenever any error occurred, the daemon sent a NAK response. However, the NetSCSI device driver did not handle the NAK properly. In fact, it did nothing with it. Any fault resulted in a timeout, which caused a retransmission. But a bug occurs when the daemon received two STP command packets in sequence. The first command packet was a write command. The consequence of this in the original buggy code is that it responded with a NAK packet due to the second command packet (it expects a data packet instead) and also a status packet (which it should not!). This status packet tells the NetSCSI device driver that the first SCSI command (which formed the first STP command packet) was successfully completed. But it did not, because its so-called data is the second command packet which would result in the corruption of some data on the disk.

FDISK

In order to mount the NetSCSI disk to the switch, a FDISK has to be called by NMP prior to mounting to recognize the disk and its file partitions first. As explained in section above, the partition table of each detected NetSCSI disk cannot be initialized during bootup. However, this information must be known before mounting of the NetSCSI disk can occur. This information is properly passed by NMP by calling FDISK. At this time, the NIC would be up and running and thus able to transfer network packets between the switch and the NetSCSI disk.

Improving SCSI performance

Traditional SCSI device drivers utilized queued commands, scatter-gather and cmd_per_lun to obtain performance gains. Queued commands determine the number of outstanding commands the device driver can process simultaneously. Scatter-gather is a method of increasing SCSI throughput by combining many small SCSI requests into a few large SCSI requests. Implementing would mean changes to the Linux daemon code too. Cmd_per_lun is the notion of "linked commands." Linked commands allow several commands to be queued consecutively to a single SCSI device.

Increasing MAXDATAGRAM

MAXDATAGRAM is a constant within NetSCSI which specifies the maximum size of the STP datagram which can be transmitted or received. Currently, thus is set at 1040 bytes, the equivalent of 1 data block that SCSI normally uses. It has been observed that SCSI may transmit up to 3 data blocks in one command so by increasing MAXDATAGRAM up to that amount can lead to less data packets needed for transmission, thus increasing throughput.

Additional Network Ports for Switch PC

A drawback of the NetSCSI embodiment was that all the file processing was done on the switch PC. This created a bottleneck situation. A way to increase throughput could be to add a second or even third NIC to the switch PC (this changes the access model). This allows parallelism of data transfers between the switch and NetSCSI disks. This is the equivalent of having a second SCSI controller to add parallelism in traditional SCSI systems. Emulating a second SCSI controller (another channel) in software alone to access multiple drive was attempted. It did not produce improved results in the NetSCSI system as all SCSI command was piped through queuecommand( ) and then send to the same NIC. It merely provided for a different indexing of SCSI commands. Adding an additional NIC would make the second channel a physical reality.

Internalizing the Linux NetSCSI Daemon

The daemon is currently run as a network daemon. This forces a limit on the rate at which it can process the incoming and outgoing NetSCSI packets. A possible solution to this would be to bring this processing down to the Linux kernel. Having said this, it must be mentioned that the current plan for a production-level NetSCSI disk is having the Linux daemon and SCSI controller hard-coded onto a chip. This remains an in-kernel versus out-of-kernel issue. But having it hardcoded would increase the processing speed many fold. So this internalization may not be all that necessary.

Security

The issue of security is something that has not been incorporated into NetSCSI at this stage. Right now, it is possible to access a NetSCSI drive if you just know its network address (MAC or IP). Possible security enhancements might include data transfer authentication or encryption.

The foregoing description of various embodiments of the invention has been presented for purposes of illustration and description. The description is not intended to limit the invention to the precise forms disclosed. Many modification and equivalent arrangements will apparent to people skilled in the art.

What is claimed is:

1. A device implementing mirrored storage across a network, including:
a disk controller configured to read and write mirrored storage devices;
a plurality of storage devices using a network protocol to communicate with the disk controller; and
logic cooperating with the disk controller to transmit a packet addressed to a group of storage devices and directing action by at least two of the storage devices;
wherein data returned by the storage devices in response to the packet is staggered.

2. The device of claim 1, wherein multiple commands are included in the packet.

3. The device of claim 2, wherein the packet includes commands compliant with one or more SCSI protocols.

4. The device of claim 1, wherein the network protocol includes transmitting the packet in an Ethernet packet.

5. The device of claim 1, wherein the network protocol includes communicating the packet using a fibre channel protocol.

6. The device of claim 1, wherein the network protocol includes encapsulating the packet in an IP packet.

7. The device of claim 6, wherein the network protocol further includes transporting the IP packet using UDP.

8. The device of claim 6, wherein the network protocol further includes transporting the IP packet using TCP.

9. The device of claim 1, wherein the packet includes commands compliant with one or more SCSI protocols.

10. A device implementing striped and parity guarded storage across a network, including:
a disk controller configured to read and write striped and parity storage devices;
three or more storage devices using a network protocol to communicate with the disk controller; and
logic cooperating with the disk controller to transmit a packet addressed to a group of storage devices and directing action by at least two of the storage devices;
wherein data returned by the storage devices in response to the packet is staggered.

11. The device of claim 10, wherein multiple commands are included in the transmitted packet.

12. The device of claim 11, wherein the packet includes commands compliant with one or more SCSI protocols.

13. The device of claim 10, wherein the network protocol includes placing packets in Ethernet packets.

14. The device of claim 10, wherein the network protocol includes communicating the packet using a fibre channel protocol.

15. The device of claim 10, wherein the network protocol includes encapsulating the packet in an IP packet.

16. The device of claim 15, wherein the network protocol further includes transporting the IP packets using UDP.

17. The device of claim 15, wherein the network protocol further includes transporting the IP packets using TCP.

18. The device of claim 15, wherein the packet includes commands compliant with one or more SCSI protocols.

19. A device implementing networked RAID, including:
a RAID controller;
a plurality of storage devices using a network protocol to communicate with the RAID controller; and
logic cooperating with the RAID controller to multicast a command packet from the RAID controller to the storage devices;
wherein data returned by the storage devices in response to the packet is staggered.

20. The device of claim 19, wherein multiple commands are included in the multicast command packet.

21. The device of claim 20, wherein the command packet includes commands compliant with one or more SCSI protocols.

22. The device of claim 19, wherein the RAID controller is implemented on a switch configured as a virtual storage device, comprising one or more input processors, logic to process packets, switch fabric, a forwarding table and one or more output processors.

23. The device of claim 22, wherein the switch further comprises a file system.

24. The device of claim 23, wherein the file system complies with a NFS protocol.

25. The device of claim 23, wherein the file system complies with a CIFS protocol.

26. The device of claim 19, wherein at least one of the storage devices is a switch configured as a virtual storage device.

27. The device of claim 19, wherein the network protocol includes placing the command packet in an Ethernet packet.

28. The device of claim 19, wherein the network protocol includes communicating the command packet using a fibre channel protocol.

29. The device of claim 19, wherein the network protocol includes encapsulating the command packet in an IP packet.

30. The device of claim 29, wherein the network protocol further includes transporting the IP packet using UDP.

31. The device of claim 29, wherein the network protocol further includes transporting the IP packet using TCP.

32. The device of claim 19, wherein the command packet includes commands compliant with one or more SCSI protocols.

33. A device implementing networked RAID, including:
a RAID controller;
a plurality of storage devices using a network protocol to communicate with the RAID controller; and
logic cooperating with the RAID controller to multicast a data packet from the RAID controller to the storage devices;
wherein data returned by the storage devices in response to the packet is staggered.

34. The device of claim 33, wherein the storage devices include forward error correction logic operative to correct errors in the data packet.

35. The device of claim 33, wherein the logic to multicast data packets includes logic to add forward error correction codes to the data packet.

36. The device of claim 33, wherein the logic to multicast data packet does not require confirmation of receipt from the storage devices.

37. The device of claim 33, wherein the RAID controller is implemented on a switch configured as a virtual storage device, comprising one or more input processors, logic to process packets, switch fabric, a forwarding table and one or more output processors.

38. The device of claim 37, wherein the switch further comprises a file system.

39. The device of claim 38, wherein the file system complies with a NFS protocol.

40. The device of claim 38, wherein the file system complies with a CIFS protocol.

41. The device of claim 33, wherein at least one of the storage devices is a switch configured as a virtual storage device.

42. The device of claim 33, wherein the network protocol includes placing the data packet in an Ethernet packet.

43. The device of claim 33, wherein the network protocol includes communicating the data packet using a fibre channel protocol.

44. The device of claim 33, wherein the network protocol includes encapsulating the data packet in an IP packet.

45. The device of claim 44, wherein the network protocol further includes transporting the IP packet using UDP.

46. The device of claim 44, wherein the network protocol further includes transporting the IP packet using TCP.

47. A method implementing networked mirrored storage, using a disk controller communicating by a network protocol with a plurality of storage devices, including the steps:
transmitting from a disk controller a command to read data, said command addressed to a group of storage devices and directing action by at least two storage devices; and
receiving data from the storage devices, wherein the data received in response to the read data command is staggered.

48. The method of claim 47, wherein the data being read is located at the same logical address within extents of two or more storage devices.

49. The method of claim 47, wherein the step of transmitting includes placing the command in an Ethernet packet.

50. The method of claim 47, wherein the step of transmitting includes communicating the command packet using a fibre channel protocol.

51. The method of claim 47, wherein the step of transmitting includes encapsulating the command packet in an IP packet.

52. The method of claim 51, wherein the step of transmitting further includes transporting the IP packet using UDP.

53. The method of claim 51, wherein the step of transmitting further includes transporting the IP packet using TCP.

54. The method of claim 51, wherein the command packet includes commands compliant with one or more SCSI protocols.

55. A device implementing mirrored storage across a network, including:
a disk controller configured to read and write mirrored storage devices;
a plurality of storage devices using a network protocol to communicate with the disk controller; and
logic cooperating with the disk controller to transmit a packet, said packet to be received and acted upon by at least two of the storage devices;
wherein the disk controller is implemented on a switch configured as a virtual storage device, comprising one or more input processors, logic to process packets, switch fabric, a forwarding table and one or more output processors.

56. The device of claim 55, wherein the switch further comprises a file system.

57. The device of claim 56, wherein the file system complies with a NFS protocol.

58. The device of claim 56, wherein the file system complies with a CIFS protocol.

59. A device implementing mirrored storage across a network, including:
a disk controller configured to read and write mirrored storage devices;
a plurality of storage devices using a network protocol to communicate with the disk controller; and
logic cooperating with the disk controller to transmit a packet, said packet to be received and acted upon by at least two of the storage devices;
wherein at least one of the storage devices is a switch configured as a virtual storage device.

60. A device implementing striped and parity guarded storage across a network, including:
- a disk controller configured to read and write striped and parity storage devices;
- three or more storage devices using a network protocol to communicate with the disk controller; and
- logic cooperating with the disk controller to transmit a packet, said packet to be received and acted upon by at least two of the storage devices;
- wherein the disk controller is implemented on a switch configured as a virtual storage device, comprising one or more input processors, logic to process packets, switch fabric, a forwarding table and one or more output processors.

61. The device of claim 60, wherein the switch further comprises a file system.

62. The device of claim 61, wherein the file system complies with a NFS protocol.

63. The device of claim 61, wherein the file system complies with a CIFS protocol.

64. A method implementing networked mirrored storage, using a disk controller communicating by a network protocol with a plurality of storage devices, including the steps:
- transmitting from a disk controller a command to read data, said command to be received and acted upon by at least two storage devices;
- receiving data from the storage devices; and
- comparing the received data to verify its integrity;
- wherein the disk controller is implemented on a switch configured as a virtual storage device, comprising one or more input processors, logic to process packets, switch fabric, a forwarding table and one or more output processors.

65. The method of claim 64, wherein the switch further comprises a file system.

66. The method of claim 65, wherein the file system complies with a NFS protocol.

67. The method of claim 65, wherein the file system complies with a CIFS protocol.

68. A method implementing networked mirrored storage, using a disk controller communicating by a network protocol with a plurality of storage devices, including the steps:
- transmitting from a disk controller a command to read data, said command to be received and acted upon by at least two storage devices;
- receiving data from the storage devices; and
- comparing the received data to verify its integrity;
- wherein at least one of the storage devices is a switch configured as a virtual storage device.

69. A device implementing striped and parity guarded storage across a network, including:
- a disk controller configured to read and write striped and parity storage devices;
- three or more storage devices using a network protocol to communicate with the disk controller; and
- logic cooperating with the disk controller to transmit a packet, said packet to be received and acted upon by at least two of the storage devices;
- wherein at least one of the storage devices is a switch configured as a virtual storage device.

70. A method implementing striped networked storage with parity, using a disk controller communicating by a network protocol with a plurality of storage devices, including:
- transmitting from a disk controller a command to write data to three or more storage devices;
- organizing data in accordance with a data striping and parity protocol; and
- transmitting the organized data to the storage devices using a network protocol;
- wherein the disk controller is implemented on a switch configured as a virtual storage device, comprising one or more input processors, logic to process packets, switch fabric, a forwarding table and one or more output processors.

71. The method of claim 70, wherein the switch further comprises a file system.

72. The method of claim 71, wherein the file system complies with a NFS protocol.

73. The method of claim 71, wherein the file system complies with a CIFS protocol.

74. A method implementing striped networked storage with parity, using a disk controller communicating by a network protocol with a plurality of storage devices, including:
- transmitting from a disk controller a command to write data to three or more storage devices;
- organizing data in accordance with a data striping and parity protocol; and
- transmitting the organized data to the storage devices using a network protocol;
- wherein at least one of the storage devices is a switch configured as a virtual storage device.

* * * * *